(12) United States Patent
Chong et al.

(10) Patent No.: US 10,390,214 B2
(45) Date of Patent: *Aug. 20, 2019

(54) USING A PLURALITY OF SIM CARD INTERFACES AND A PLURALITY OF RADIO FREQUENCY UNITS

(71) Applicant: Pismo Labs Technology Limited, Hong Kong (HK)

(72) Inventors: Ming Pui Chong, Hong Kong (HK); Wan Chun Leung, Hong Kong (HK)

(73) Assignee: PISMO LABS TECHNOLOGY LIMITED, Kowloon (HK)

(*) Notice: Subject to any disclaimer, the term of this patent is extended or adjusted under 35 U.S.C. 154(b) by 0 days.

This patent is subject to a terminal disclaimer.

(21) Appl. No.: 15/496,009

(22) Filed: Apr. 25, 2017

(65) Prior Publication Data
US 2017/0230821 A1 Aug. 10, 2017

Related U.S. Application Data

(63) Continuation of application No. 14/396,751, filed on Oct. 24, 2014, now Pat. No. 9,635,541.

(51) Int. Cl.
H04W 8/18 (2009.01)
H04W 76/10 (2018.01)
(Continued)

(52) U.S. Cl.
CPC .......... *H04W 8/183* (2013.01); *H04B 1/3816* (2013.01); *H04N 7/181* (2013.01);
(Continued)

(58) Field of Classification Search
CPC ....... H04W 88/06; H04W 48/18; H04W 8/18; H04W 4/001; H04W 4/003; H04W 72/02; H04W 76/025; H04W 72/1215; H04W 16/14; H04W 36/08; H04W 4/02; H04W 4/025; H04W 76/026; H04W 8/183; H04W 76/02; H04W 12/06; H04W 76/10;
(Continued)

(56) References Cited

U.S. PATENT DOCUMENTS

2008/0198811 A1* 8/2008 Deshpande ........... H04W 48/16
370/332
2008/0220788 A1* 9/2008 Stanwood ............. H04L 5/0007
455/450
(Continued)

FOREIGN PATENT DOCUMENTS

GB 2422747 A * 8/2006 ............ H04W 88/02

*Primary Examiner* — Daniel Lai
(74) *Attorney, Agent, or Firm* — Hershkovitz & Associates, PLLC; Abe Hershkovitz

(57) ABSTRACT

A method, an apparatus and a system for using at least one SIM card interface selector to connect a plurality of radio frequency (RF) units with a plurality of Subscriber Identification Module (SIM) card interfaces in order to establish wireless connections. The quantity of SIM card interfaces is the same as or more than quantity of RF units. Further, selection of SIM card interfaces is substantially based on geographical location, data usage, time, duration of usage, and/or billing cycle information. Further, tunnels established through the wireless connections are aggregated together to form one aggregated tunnel.

16 Claims, 13 Drawing Sheets

(51) Int. Cl.
*H04W 48/18* (2009.01)
*H04B 1/3816* (2015.01)
*H04N 7/18* (2006.01)
*H04W 76/12* (2018.01)
*H04W 76/15* (2018.01)
*H04W 84/12* (2009.01)

(52) U.S. Cl.
CPC ........... *H04W 48/18* (2013.01); *H04W 76/10* (2018.02); *H04W 76/12* (2018.02); *H04W 76/15* (2018.02); *H04W 84/12* (2013.01)

(58) Field of Classification Search
CPC ....... H04W 4/60; H04W 4/50; H04W 84/042; H04W 88/02; H04W 36/14; H04W 60/005; H04W 76/15; H04W 8/26; H04W 48/20; H04W 60/00; H04W 8/02; H04W 8/12; H04W 24/02; H04W 60/04; H04W 8/20; H04W 8/22; H04W 36/24; H04W 48/04; H04W 48/14; H04W 76/00; H04W 76/12; H04W 76/50; H04W 80/00; H04W 8/04; H04W 8/186; H04W 24/04; H04W 4/00; H04W 4/021; H04W 4/04; H04W 4/16; H04W 4/21; H04W 4/70; H04W 84/12; H04B 1/3816; H04B 1/3827; H04B 1/3818; H04M 15/8038; H04M 17/103; H04M 15/7556; H04M 15/751; H04M 15/765; H04M 15/80; H04M 15/8016; H04M 15/8044; H04M 15/8055; H04M 15/00; H04M 15/39; H04M 15/49; H04M 15/50; H04M 15/51; H04M 15/52; H04M 15/56; H04M 15/58; H04M 15/61; H04M 15/63; H04M 15/745; H04M 15/7652; H04M 15/77; H04M 15/771; H04M 15/8033; H04M 15/805; H04M 15/8061; H04M 15/8083; H04M 15/8214; H04M 15/852; H04M 15/854; H04N 7/181

See application file for complete search history.

(56) References Cited

U.S. PATENT DOCUMENTS

| | | | | |
|---|---|---|---|---|
| 2010/0240414 | A1* | 9/2010 | Lotenberg | H04W 8/183 455/558 |
| 2011/0032868 | A1* | 2/2011 | Huang | H04L 12/4633 370/328 |
| 2012/0275445 | A1* | 11/2012 | Karlsson | H04W 8/183 370/338 |
| 2013/0016682 | A1* | 1/2013 | Russell | G01S 5/0252 370/329 |
| 2013/0109436 | A1* | 5/2013 | Tat | H04W 8/183 455/558 |
| 2013/0311778 | A1* | 11/2013 | Cherukuri | H04L 63/0272 713/171 |
| 2015/0057044 | A1* | 2/2015 | Altman | H04W 4/003 455/558 |
| 2015/0141012 | A1* | 5/2015 | Ramkumar | H04W 48/20 455/435.3 |
| 2015/0245309 | A1* | 8/2015 | Nayak | H04W 60/005 455/435.3 |

* cited by examiner

USING A PLURALITY OF SIM CARD INTERFACES AND A PLURALITY OF RADIO FREQUENCY UNITS

RELATED APPLICATIONS

The present application is a non-provisional Continuation application of non-provisional application Ser. No. 14/396,751 titled "USING A PLURALITY OF SIM CARDS AT A WIRELESS COMMUNICATION DEVICE" filed on 24 Oct. 2014 priority is claimed thereto.

TECHNICAL FIELD

The present invention relates in general to the field of using a plurality of subscriber identity module (SIM) cards. More particularly, the present invention relates to methods and systems for an electronic device to use a plurality of SIM card interfaces with a plurality of RF units.

BACKGROUND ART

It is known that some of multi-SIM devices that have at least two SIM cards are capable to select and use a second SIM card, in case where the wireless connection with the communication network established using the first SIM card is disconnected or data packets are not transmitted. The second SIM card can be used as a fallback SIM card.

However, there may be many reasons why the first SIM card should or should not be used again after the wireless communication established by the using first SIM card has been disconnected or terminated. There are also many reasons why the second SIM card or even other SIM cards at the multi-SIM device should or should not be used after the wireless communication established by the using second SIM card is still in operation. A user may want to have the flexibility to configure the multi-SIM device so that the processing unit of the multi-SIM device can select one of a plurality of SIM cards according to different events.

DISCLOSURE OF INVENTION

Summary of Invention

The present invention discloses apparatuses to select subscriber identity module (SIM) card at an electronic device. The selection comprises: when a first event trigger occurring and the electronic device stops using a first SIM card. The electronic device then uses a second SIM card. When a second event trigger occurs, the electronic device stops using the second SIM card and then uses either a first, second or another SIM card as the operational SIM card. The first event trigger and the second event trigger are substantially based on geographical location, data usage, received signal quality, time, duration of usage, billing cycle information and/or network performance.

According to one of the embodiments of the present invention, the first RF unit is used for establishing a first wireless connection, and wherein data packets are transmitted and received using the first wireless connection when a first SIM card is being used.

According to one of the embodiments of the present invention, the second RF unit can be used for establishing a second wireless connection, wherein data packets are transmitted and received using the second wireless connection when a second SIM card is being used.

According to one of the embodiments of the present invention, the multi-SIM device verifies if a wireless connection can be established before determining that a selected SIM card is used as the operational SIM card. In one variant, when there is no SIM card selected, no operational SIM card is selected.

According to one of the embodiments of the present invention, the SIM cards can also be housed at the electronic device or are housed at an external device.

According to one of the embodiments of the present invention, the electronic device is a security camera.

DETAILED DESCRIPTION

Figure 1:
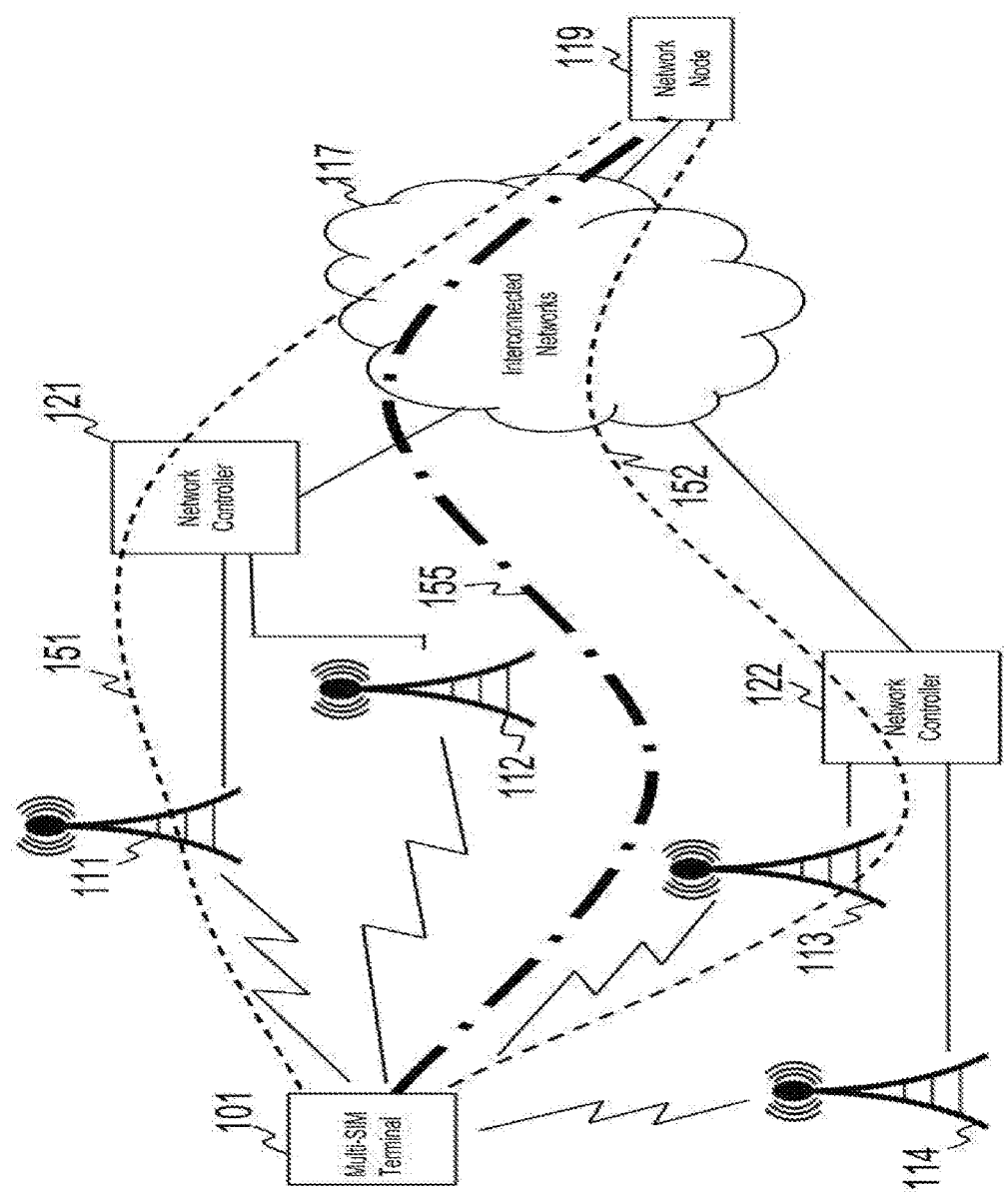
FIG. 1 is a block diagram of two wireless communication networks configured according to one of the embodiments of the present invention.

FIG. 1 illustrates two wireless communication networks, each of which may include a number of base stations and other network entities. For simplicity. FIG. 1 also illustrates four base stations 111, 112, 113 and 114 and two network controllers 121 and 122. A base station may be a fixed station that communicates with the multi-SIM communication devices and may also be referred to as an access point, a node, an evolved node, etc. A base station may provide communication coverage for a particular geographic area. The overall coverage area of a base station may be partitioned into smaller areas, and each smaller area may be served by a respective base station subsystem. The term "cell" can refer to a coverage area of a base station and/or a base station subsystem serving this coverage area, depending on the context in which the term is used. For illustration purpose only, a first wireless communication network includes base stations 111 and 112, and network controller 121; a second wireless communication network includes base stations 113 and 114, and network controller 122. The first wireless communication network and the second wireless communication network, for illustration purpose only, may be operated by a first network operator and a second network operator respectively.

Multiple Subscriber Identification Module (multi-SIM) device 101 may be one of many devices receiving wireless communication services by the first wireless communication network and the second wireless communication network. Multi-SIM communication device 101 can be a mobile phone, a router and access terminal (AT), a mobile station (MS), a wireless modem, a user equipment (UE), a subscriber unit, a station, a desktop computer, a laptop computer, a cordless phone, a wireless local loop (WLL) station, personal digital assistant (PDA), or any other networking nodes that have been developed to allow users to manage and use more than one phone number via one device and via more than one SIM card such as SIM card 201*a-c*, SIM card 251*a-c*, SIM card 291*a* and 291*b*, and SIM card 262*a* and 262*b*. This invention may cover physical SIM cards of any size, as well as soft-SIM solutions or virtual-SIM solutions.

Multi-SIM communication, device 101 may be stationary or mobile and may communicate with a base station via the downlink and uplink. The downlink (or forward link) refers to the communication link from the base station to multi-SIM communication device 101, and the uplink (or reverse link) refers to the communication link from multi-SIM communication device 101 to the base station.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA 2000 covers IS-2000, IS-95 and IS-856 standards. A TDMA network may implement a radio technology such as Global System for Mobile communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS), 3GPP Long Term Evolution (LTE) is a UMTS that uses E-UTRA, which employs OFDMA on the downlink and SC-FDMA on the uplink, UTRA, E-UTRA, UMTS, LTE and GSM are described in documents from an organization named "3rd Generation Partnership Project" (3GPP). CDMA 2000 and UMB are described in documents from an organization named "3rd Generation Partnership Project 2" (3GPP2).

Figure 2A:
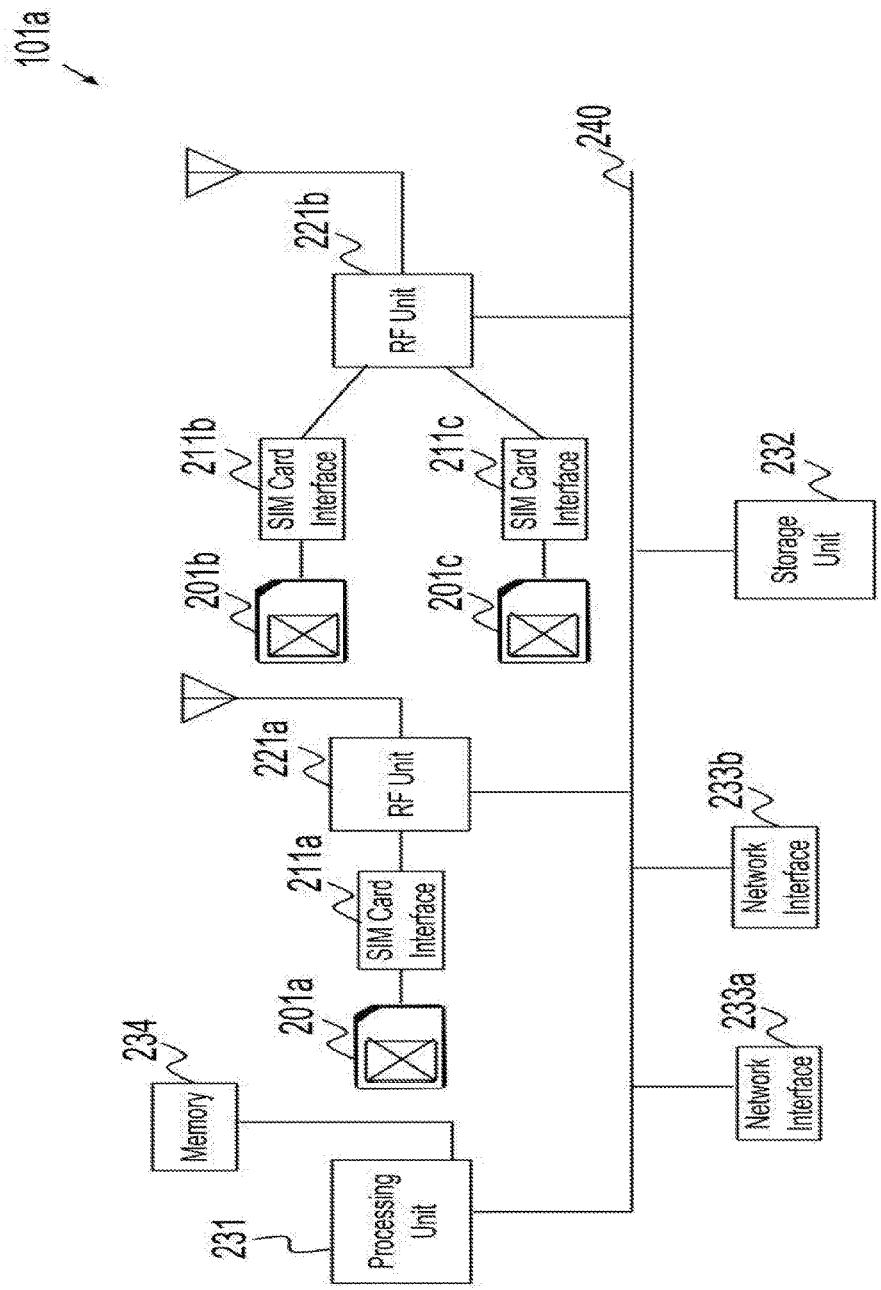
FIG. 2A is a block diagram of multi-SIM communication device with at least two RF units configured according to one of the embodiments of the present invention.

FIG. 2A illustrates one of embodiments according to the present invention. Multi-SIM communication device 101A has at least two radio units. There can be more number of SIM card interfaces than the number of radio frequency (RF) units. RF units, such as RF units 221*a* and 221*b*, are connected to embedded/external antennas respectively. A RF unit can be connected to one or more SIM card interface. An external device connected to multi-SIM communication device 101 may also house RF units and SIM card interfaces, and thus RF units and SIM card interfaces are not housed by multi-SIM communication device 101. A SIM card can be placed in the external device. For example, the external device is a Universal Serial Bus (USB) 3GPP modem. In another example, the external device is a Universal Serial Bus (USB) LTE modem. Multi-SIM device 101 is capable of connecting to one or more external devices. For example, a USB modem is connected to the USB interface of multi-SIM device 101. According to one of the embodiments of the present invention, the RF unit or the multi-SIM device to be reset in order for it to be able to use another SIM card. One of the methods to reset to RF unit is to power-cycle the RF unit. For example RF unit 221*a* is connected to SIM card interface 221*a* only and RF unit 221*b* is connected to SIM card interfaces 211*b* and 211*c*. When RF unit 221*b* is using SIM card 201*b*, RF unit 221*b* cannot use SIM card 201*c*. Processing unit 231, for example, can instruct RF unit 221*b* to use SIM cards 201*b* and 201*c* in tandem through SIM card interfaces 211*b* and 211*c* respectively. In another example, processing unit 231 can instruct RF unit 221*b* to use only one of SIM cards 201*b* and 201*c* until an event that triggers processing unit 231 to instruct RF unit 221*b* to use another SIM card.

Memory, such as 234, 285, 297 and 266 may represent one or more devices for storing data in a volatile state. These devices may include random access memory (RAM), magnetic RAM, core memory and/or other machine readable mediums for storing volatile data.

A storage unit, such as storage unit 232, 282, 296 and 267 may represent one or more devices for storing data, including read only memory (ROM), magnetic disk storage mediums, optical storage mediums, flash memory devices and/or other machine readable mediums for storing information.

The term "machine-readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine readable medium including a virtual machine readable medium in a cloud-based instance. Furthermore, embodiments may be implemented by hardware, software, firmware, middleware, microcode, hardware description, languages, or any combination thereof. When implemented in software, firmware, middleware or microcode, the program code or code segments to perform the necessary tasks may be stored in a machine readable medium such as storage medium.

A processing unit, such as processing unit 231, 281, 295 and 265 may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. A processing unit(s) can be realized by virtualization, and can be a virtual processing unit(s) including a virtual processing unit in a cloud-based instance.

A SIM card interface, such as SIM card interfaces 261a-261b, 201a-211c, 292a and 292b, and 263a and 263b, 264a and 264b is used to access and write information to and from a SIM card. There are many SIM card interfaces available from different manufacturers. Some of the SIM card interfaces provide functions of power supply, card reset signal, card clock signal and data exchange. A data exchange can be performed between the SIM card and processing unit 231, SIM Card Interface Selector 284 or RF units 221. Some of SIM card interfaces can only be connected with one SIM card while some can be connected to a plurality of SIM cards. Examples of SIM card interface include ON Semiconductor's NCN6804 and NCN8024, and Fairehild Semiconductor's FXLP4555.

A network interface, such as network interface 233a, 233B, 283a, 283b, 294a, 294b, 268a and 268b in multi-SIM communication device 101, may be an Ethernet interface, a frame relay interface, a fibre optic interface, a cable interface, a DSL interface, a token ring interface, a serial bus interface, an universal serial bus (USB) interface, Firewire interface, Peripheral Component Interconnect (PCI) interface, etc. There may be more than one network interface in multi-SIM communication device 101. A network interface may be used as a local area network (LAN) interface or a wide area network (WAN) interface.

System bus such as 240, 241, 242 and 243 allows multi-SIM communication device 101 to have increased modularity. For example, System bus 240 couples processing unit 231 to storage unit 232, SIM card 201a, network interface 233a, and RF unit 221b. System bus can be any of several types of bus structures including a memory bus, a peripheral bus, and a local bus using any of a variety of bus architectures.

Multi-SIM communication device 101A may be within the coverage of multiple base stations. More than one of base stations may be selected from these multiple base stations to serve multi-SIM communication device 101a. The selection of one or more serving base stations may be referred to as server selection. The selection of base station, to server multi-SIM communication device 101a (server selection) may be initiated by multi-SIM communication device 101a, by a base, station, and/or by the wireless communication network. Multi-SIM communication device 101a may request to be served by a base station. The base station may accept or reject the request. The wireless communication network may also accept or reject the request. A base station or wireless communication network may consider one or more factors to determine whether to accept or reject the request, including network capacity, processing capacity, number of concurrent connections, and etc.

In one example, when the server selection is initiated by a base station, multi-SIM communication device 101a may or may not be able to reject the server selection if multi-SIM communication device 101a decides to connect to the same network. Then base station 111 or base station 112 may instruct multi-SIM communication device 101a to connect to base station 111 when multi-SIM communication device 101a has already been connected with base station 112. If multi-SIM communication device 101a refuses to connect to base station 111, multi-SIM communication device 101a will not be able to connect to the first wireless communication network through base station 112 as base station 112 will later disconnect with multi-SIM communication device 101a.

In one example, multi-SIM communication device 101a may try to connect to a particular base station, such as base station 112. Multi-SIM communication device may send the request to the first wireless communication. It the request is authorised, then multi-SIM communication device can then connect to base station 111.

A base station is a qualified base station if the received signal quality from the base station, is above a threshold and multi-SIM communication device 101a can be authorized to connect to the base station by using information from one of SIM cards 201. In one variant, if a base station can only be connected through a RF unit that is capable of establishing a wireless connection with a LTE network, the base station can only be a qualified base station when using the RF unit. The base station may not be a qualified base station when using another RF unit, which is not capable of establishing a wireless connection with a LTE network.

When processing unit 231 determines to establish a wireless connection with a base station, the base station is the Selected Base Station. The Selected Base Station is connected using one of RF units 221 using authentication information retrieved from a corresponding SIM card. It is possible that a Selected Base Station cannot be connected to because of many reasons, including lack of capacity at the Selected Base Station, refusal by the Selected Base Station, etc.

A RF unit is available when it has not established any wireless connection. If a RF unit is not available, the RF unit cannot be used to establish an additional wireless connection. In one example, in order to have a RF unit that is originally unavailable to become available, the RF unit may need to disconnect established wireless connection before establishing another wireless connection.

Figure 3A:
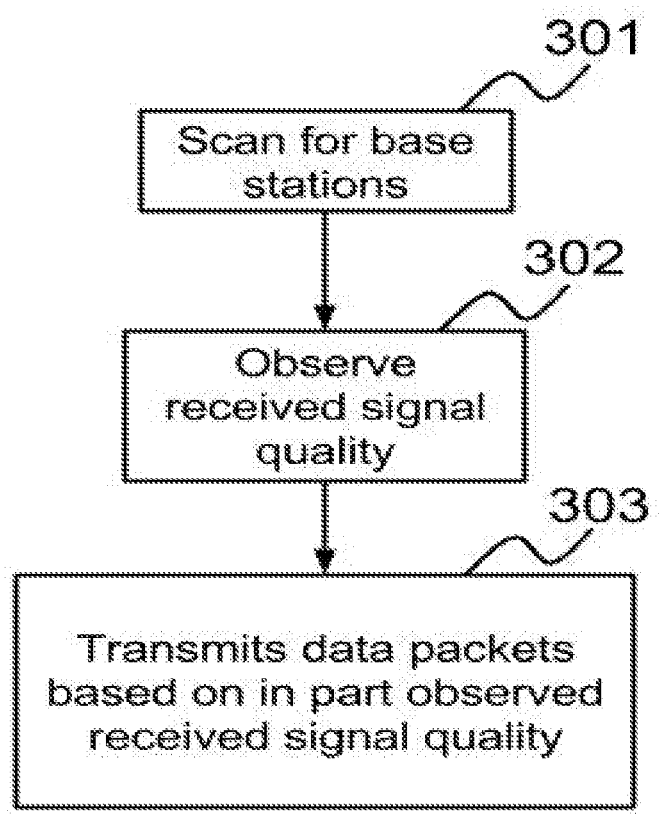
FIG. 3A is a flowchart of a process for transmitting data packets based in part on observed received signal quality configured according to one of the embodiments of the present invention.

FIG. 3A illustrates one of the embodiments according to the present invention. At step 301, processing unit 231 instructs one of RF units 221 (Scanning RF Unit) to scan for base stations that multi-SIM communication device 101a can be connected to. Although multi-SIM communication device 101a may find many base stations during the scan, multi-SIM communication device 101a only observes received signal quality for those base stations that multi-SIM communication device 101a can connect to. Multi-SIM communication device 101a can only connect to base stations operated by network operators that authorize SIM cards 201 to connect to. For example, use of SIM cards 201a, 201b and 201c allows multi-SIM communication device 101a to connect to a base station of a wireless communication network operated by a first network operator, a second network operator and a third network operator respectively. As base stations 111 and 112 are operated by the first network operator and base stations 113 and 114 are operated by the second network operator, multi-SIM communication device 101a can connect to base stations 111-114 by using SIM cards 201a or 201b. In another example, a plurality of SIM cards 201 may be used by processing unit 231 to enable multi-SIM communication device 101a to establish more than one wireless connection with a base station.

When processing unit 231 selects SIM cards 211b or 221c for RF unit 221b for use, processing unit 231 instructs RF unit 221b to select SIM card interface 211b or 211c for SIM cards 211b or 211c respectively according to the instruction sent by processing unit 231. Alternatively, RF unit 221b does not connect to SIM card interfaces 211b and 211c directly. Instead, SIM card interfaces 211b and 211c are connected to bus 240. In such case, SIM card information is retrieved from SIM card interfaces 211b and/or 211c and then sent to RF unit 221b. Alternatively, there could be a SIM card interface selector, like the one illustrated in FIG. 7 for the embodiment illustrated in FIG. 2B, connects SIM card interfaces 211b and 211c to RF unit 221b and is controlled by processing unit 231. Examples of a SIM card interface selector for two SIM card interfaces include TXS02326 Dual-Supply 2:1 SIM Card Multiplexer/Translator supplied by Texas Instruments and LTC4557 Dual SIM/Smart Card Power Supply and interface supplied by Linear Technology.

At step 302, the Scanning RF Unit observes received signal quality of the base stations 111, 112, 113 and 114. Both RF units 221a and 221b can be the Scanning RF Unit. For example, RF unit 221b is the Scanning RF Unit, while RF unit 221a is not Scanning RF Unit and will not perform received signal quality observation. In one example, RF unit 221a is a Scanning RF Unit for a period of time and then not being the Scanning RF Unit for another period of time. Therefore, RF unit 221a may be able to perform other non-received signal quality observation functions when RF unit 221a is not a Scanning RF Unit. It is preferred that only one of RF units 221a and 221b is a Scanning RF Unit at any particular moment as the benefits of more than one RF units to observe received signal quality is limited. As some RF units may not be able to provide data communication functions when being a Scanning RF Unit, the shorter period of time a RF unit is a Scanning RF, the more time the RF unit can provide data communication functions. In one variant, as different RF units are used as Scanning RF Units, it is possible that observed received signal qualities associated with a base station are different. Processing unit 231 may average the observed received signal qualities or choose the most recent observed received signal quality before further processing.

Steps 301 and 302 may be performed all the time, periodically and/or upon an instruction received by processing unit 231. The more frequent step 301 is performed, the sooner multi-SIM communication device 101a may be able to connect to a base station that has better received signal quality and may result in higher data throughput. If a RF unit is not able to perform steps 301 and/or step 302 while being wirelessly connected with a base station, step 301 and/or step 302 should be not performed. If a RF unit is not able to perform scanning while transmitting or receiving data from the wireless connected base station, step 301 and/or step 302 should be performed less frequently in order to avoid interruptions to data transmission and receiving.

In one variant, the frequency of performing steps 301 and 302 can be different. The frequency of performing step 302 is preferred to be performed more frequently than of step 301. The number of base stations available to be connected does not change significantly if multi-SIM communication device 101a does not move much. However, received signal quality may change even if multi-SIM communication device 101a is stationary. After step 301 is performed, step 302 may be performed a number of times before step 301 is performed again. In one example, step 301 is performed every thirty seconds and step 302 is performed ten times every thirty seconds.

At step 303, processing unit 231 transmits data packets based in part on observed received signal quality after observing received signal quality of base stations 111-114. The Scanning RF Unit may be able to observe received signal quality of base stations other than base stations 111-114. It is preferred that processing unit 231 does not transmit data packets based in part on observed received signal quality of base stations other than base stations 111-114 because multi-SIM communication device 101a cannot connect to base stations other than base stations 111-114. For example, when processing unit 231 determines that received signal quality with base station 111 is the best among the received signal qualities with base stations 111-114, processing unit 231 transmits more data packets through base station 111 than through base stations 112, 113 and 114. In another example, when processing unit 231 determines that received signal quality with base station 111 and base station 113 are the best among the received signal qualities with base stations 111-114, processing unit 231 transmits data packets through base stations 111 and 113. In one variant, as RF unit 221a can only connect to one of base stations 111 and 112 and RF unit 221b cannot connect to any of base stations 111 and 112, multi-SIM communication device 101a can only connect one of base stations 111 and 112 through SIM card 201a and RF unit 221a. Therefore, even if received signal qualities with base stations 111 and 112 are better than received signal qualities with base stations 113 and 114, processing unit 231 will transmit data packets through RF units 221a with one of base stations 111 and 112 and through RF unit 221b with one of base stations 113 and 114.

Figure 3B:
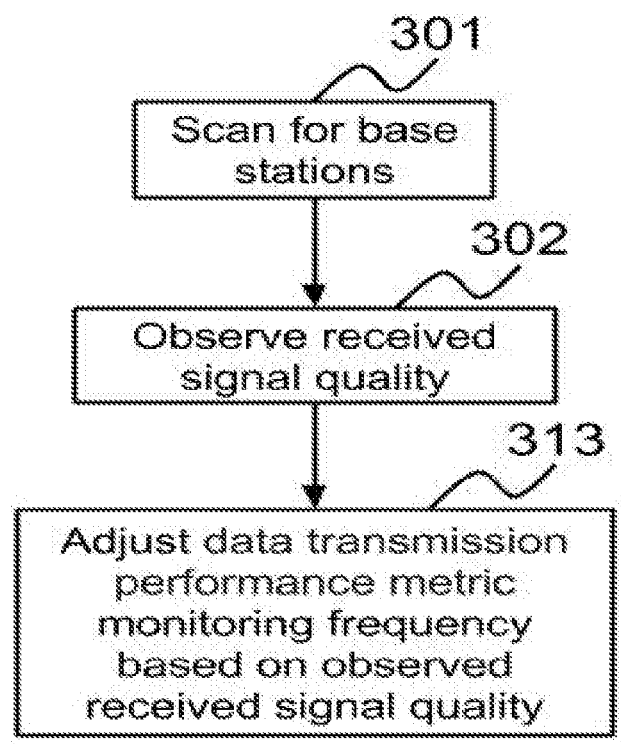
FIG. 3B is a flowchart of a process for adjusting data transmission performance metric monitoring frequency based on observed received signal quality configured according to one of the embodiments of the present invention.

FIG. 3B illustrates one of the embodiments according to the present invention. The difference between the processes in FIG. 3B and FIG. 3A is that step 303 is replaced by step 313. At step 303, processing unit 231 adjusts data transmission performance metric monitoring frequency based in part on observed received signal quality. As received signal quality of a wireless connection changes and if a RF unit is transmitting and/or receiving through the wireless connection, data transmission performance metric may be affected by the received signal quality change. When the received signal quality is good, there is less need to monitor the data transmission performance metric frequently. On the other hand, when the received signal quality is below a threshold, the data transmission performance metric monitoring should be performed more frequently as it is possible that the wireless connection can become unstable quickly. In one example, RF unit 221a is the Scanning RF Unit and RF unit 221b is transmitting data packets through a wireless connection established between RF unit 221b and base station 114. When RF unit 221a has observed the received signal quality of the wireless connection between RF unit 221b and base station 114 has dropped below a threshold, processing unit 231 monitors data transmission performance metric for data packets transmitted through RF unit 221b more frequently. When the received signal quality of the wireless connection between RF unit 221b and base station 114 has improved and is above the threshold, processing unit 231 monitors data transmission performance metric for data packets transmitted through RF unit 221b at a regular frequency. When processing unit 231 has found a wireless connection is unstable, it stops transmitting data packets through the wireless connection. In one variant, if the wireless connection with base station 114 is unstable, processing unit 231 then disconnects the wireless connection with base station 114 and tries to establish another wireless connection with another base station.

Figure 3C:
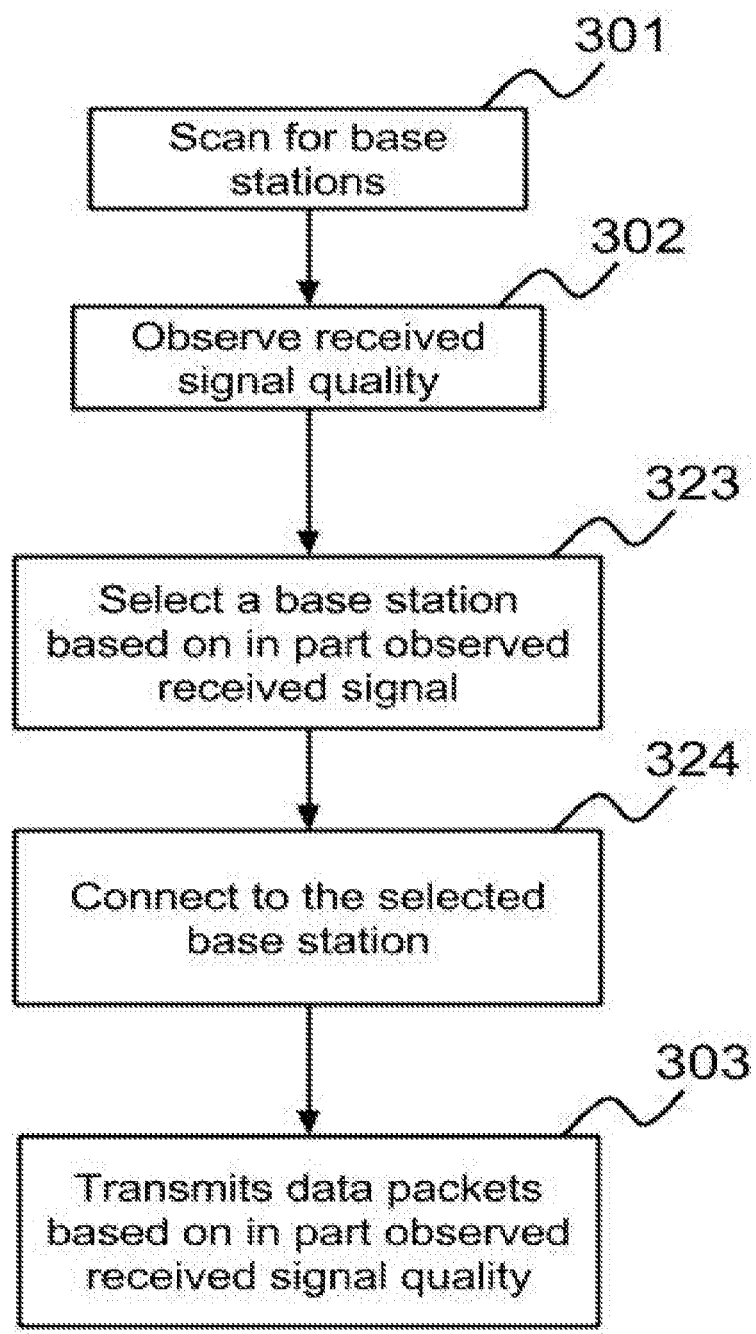
FIG. 3C is a flowchart of a process for selecting a base station based in part on observed received signal quality configured according to one of the embodiments of the present invention.

FIG. 3C illustrates one of the embodiments according to the present invention. The difference between the processes in FIG. 3B and FIG. 3A is that step 303 is replaced by steps 323 and 324. At step 323, processing unit 231 selects a base station (Selected Base Station) based in part on observed received signal quality. The better the observed received signal quality with a base station being observed, the more likely the base station is selected. The Selected Base Station should also be a base station that can be connected by one of RF units 221. If received signal quality with a base station is highest among all received signal qualities observed but the base station cannot be connected through any of RF units 221, the base station will not be selected by processing unit 231 and cannot be a Selected Base Station. In one variant, in order for processing unit 231 to select a base station to be the Selected Base Station, the received signal quality with the base station has to be higher than a threshold.

At step 324, processing unit 231 instructs one of RF units 221 to connect to the Selected Base Station if processing unit 231 decides so. For example, if the Selected Base Station is base station 114 and only RF unit 221*b* can be used to connect to base station 114. Processing unit 231 will then instruct RF unit 221*b* to connect to base station 114. In one variant, processing unit 231 will only instruct RF unit 221*b* to connect to base station 114 if RF unit 221*b* has not established any wireless connection with another base station in order to avoid breaking established communication. In one variant, processing unit 231 will only instruct RF unit 221*b* to connect to base station 114 if RF unit 221*b* has established a wireless connection, with another base station but the received signal quality with the another base station is lower than a threshold. The received signal quality with the another base station is observed at step 302. In one variant, processing unit 231 will only instruct RF unit 221*b* to connect to base station 114 if the received signal quality with RF unit 221*b* is above a threshold.

In one variant, steps 301 and 302 are being performed continuously after multi-SIM communication device 101*a* is powered up therefore processing unit 231 can continuously find base stations that are qualified to be the Selected Base Station.

Figure 2B:
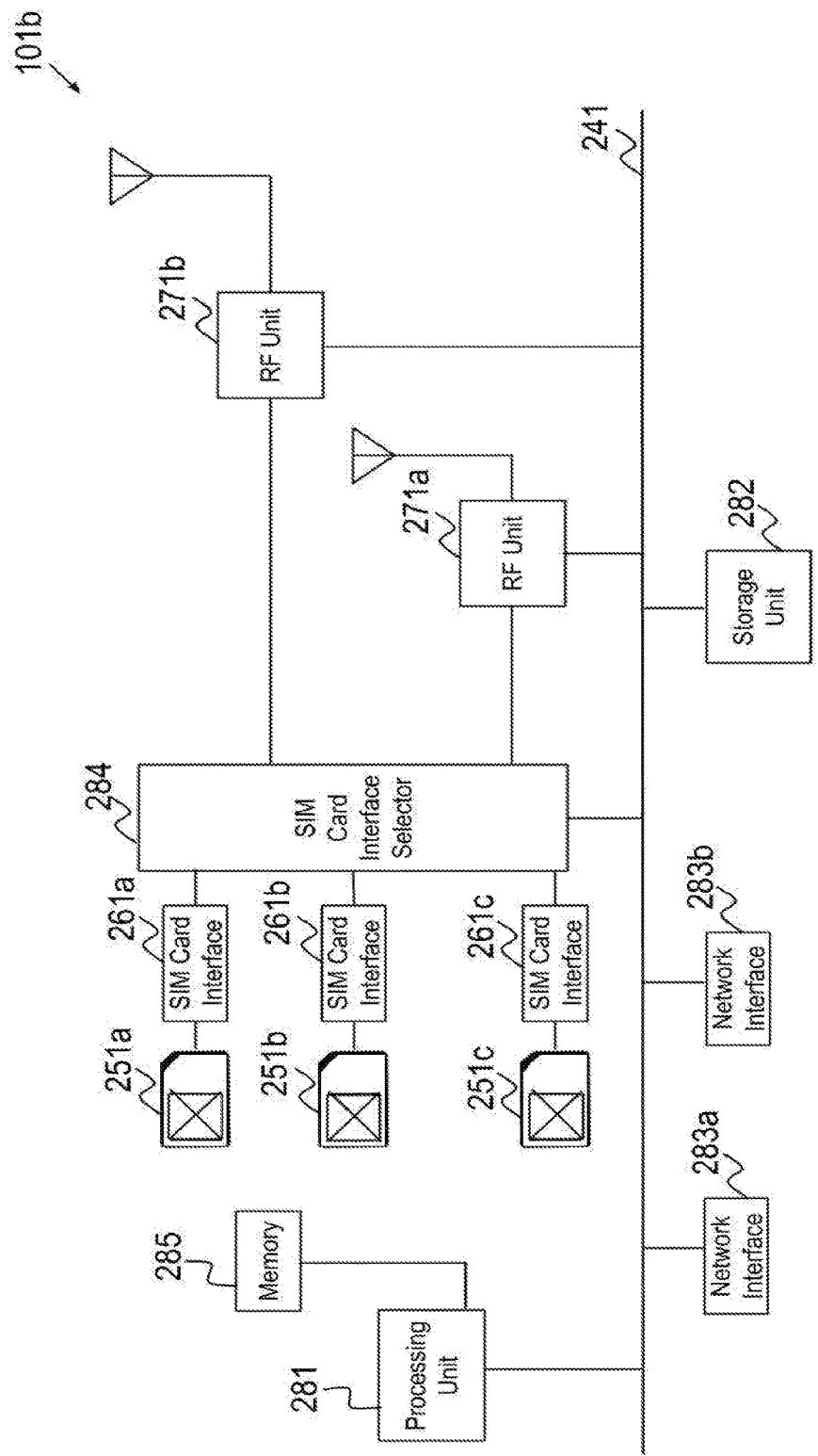
FIG. 2B is a block diagram of multi-SIM communication device with a SIM card interface selector configured according to one of the embodiments of the present invention.

FIG. 2B illustrates one of the embodiments according to the present invention. Multi-SIM communication device 101*b* has at least two radio units. There can be more number of SIM card interfaces than the number of radio frequency (RF) units. RF units, such as 271*a* and 271*b*, are connected to embedded/external antennas respectively. SIM card interface selector 284 provides access for RF units 271 to connect to SIM card interfaces 261. Instructed by processing unit 281, one or more SIM card interfaces 261 may be selected by SIM card interface selector 284 to establish wireless connections using RF units 271. In this example, SIM card interface selector 284 may select SIM card interface 261*a*, 261*b* or 261*c* for use by RF unit 271*b*. Furthermore, SIM card interface selector 284 may select SIM card interface 261*a*, 261*b* or 261*c* for use by RF unit 271*a*. Therefore, SIM card interface selector 284 is capable of allowing any RF unit 271 to use any SIM cards 251 by using multiplexing technique known to those skilled in the art. Processing unit 281 instructs RF unit 271*b* to perform other tasks when RF unit is not used to establish a wireless connection. Other tasks may include serving as a Scanning RF Unit to scan for base stations or to establish a wireless connection.

Figure 7:
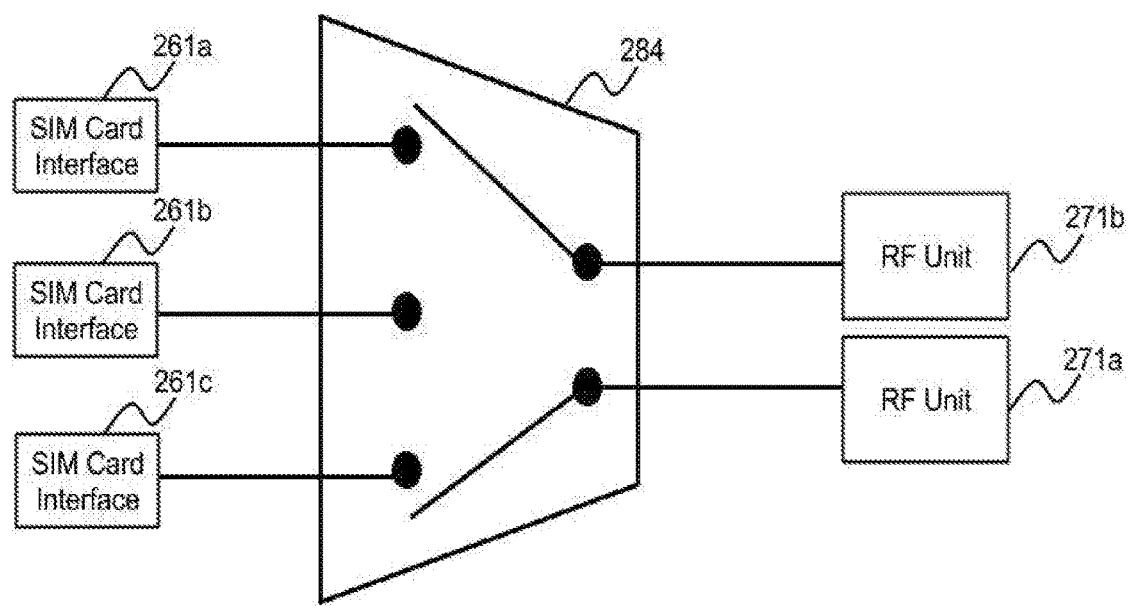
FIG. 7 is a block diagram of the SIM card interface selector configured according to one of the embodiments of the present invention.

In one example, SIM card interface selector 284 is a multiplexer that allows RF unit 271*a* and RF 271*b* connects to any of SIM card interfaces 261*a*, 261*b* and 261*c* as illustrated in FIG. 7. Preferably, when a SIM card interface is already connected to one of RF units 271, the other of RF unit 271 cannot connect to the same SIM card interface as most wireless communication networks only allow one SIM card to establish one wireless connection at any time. However, there is no limitation that one SIM card interface must be connected to one RF unit only. There is no limitation on the number of SIM card interfaces that a SIM card interface selector can connect to. Similarly, there is no limitation on the number of RF units that a SIM card interface selector can connect to.

In another embodiment, multi-SIM communication device 101*b* performs according to the steps illustrated in FIG. 3C. At step 301, processing unit 281 instructs one of RF units 271 (Scanning RF Unit) to scan for base stations that multi-SIM communication device 101*b* can be connected to. Although multi-SIM communication device 101*b* may find many base stations during the scan, multi-SIM communication device 101*b* only observes received signal quality for those base stations that multi-SIM communication device 101*b* can connect to or may observe no signal at all.

Multi-SIM communication device 101*b* can only connect to base stations operated by network operators that authorize SIM cards 251 to connect to. For example, use of SIM cards 251*a*, 251*b* and 251*c* allows multi-SIM communication device 101*b* to connect to a base station of a wireless communication networks operated by a first network operator, a second network operator and a third network operator respectively. As base stations 111 and 112 are operated by the first network operator and base stations 113 and 114 are operated by the second network operator, multi-SIM communication device 101*b* can connect, to base stations 111-114 by using SIM cards 251*a* and 251*b*. Multi-SIM communication device 101*b* may not be able to connect to the third wireless communication network using SIM card 251*c* when there are no base stations providing wireless communications service from the third wireless communication network.

In one example, a plurality of SIM cards 251 may be selected by SIM Card Interface Selector 284, and used by processing unit 281 to enable multi-SIM communication device 101*b* to establish more than one wireless connection with a base station. The selection may also be performed by processing unit 281. For example, processing unit 281 may instruct RF unit 271*a* and RF unit 271*b* to use SIM card 251*a* and SIM card 251*b* to establish wireless connections with base station 111 and base station 113 respectively. Processing unit 281 instructs SIM card interface selector 284 to provide RF units 271 access to SIM card interface 261. This may allow multi-SIM communication device 101*b* to have at least one wireless connection established with a wireless communication network. For example, when multi-SIM communication device 101*b* is out of coverage of the second wireless communication network, multi-SIM communication device 101*b* can stay connected with the first wireless communication network using SIM card 251*b*. In one variant, since SIM card 251*b* is operating without the coverage of its authorised communication network which is the second wireless communication network, multi-SIM communication device 101*b* may be configured to be operating on a roaming network and may incur network roaming charges.

At step 302, the Scanning RF Unit observes received signal quality of the base stations 111, 112, 113 and 114. Both RF units 271*a* and 271*b* can be the Scanning RF Unit. For example, RF unit 271*b* is the Scanning RF Unit while RF unit 271*a* is not Scanning RF Unit and will not perform received signal quality observation. In one example, RF unit 271*a* is a Scanning RF Unit for a period of time and then is not for another period of time. Therefore, RF unit 271*a* may be able to perform other non-received signal quality observation functions when RF unit 271*a* is not a Scanning RF Unit. It is preferred that only one of RF units 271*a* and 271*b* is a Scanning RF Unit at any particular moment as the benefits of more than one RF units to observe received signal quality is limited. As some RF units may not be able to provide data communication functions when being a Scanning RF Unit, the shorter period of time a RF unit is a Scanning RF Unit, the more time the RF unit can provide data communication functions. In one variant, as different RF units are used as Scanning RF Units, it is possible that observed received signal qualities associated with a base station are different. Processing unit 281 may average the observed received signal qualities or choose the most recent observed received signal quality before further processing.

At step 323, processing unit 281 selects a base station (Selected Base Station) based in part on observed received signal quality. The better the observed received signal quality with a base station being observed, the more likely the base station is selected. The base station may also be selected by processing unit 281 based in part on policies or algorithms or centralised management methods. The Selected Base Station should also be a base station that can be connected by one of RF units 271. If received signal quality with a base station is highest among all received signal qualities observed but the base station cannot be connected through any of RF units 271, the base station will not be selected by processing unit 281 and cannot be a Selected Base Station. In one variant, in order for processing unit 281 to select a base station to be the Selected Base station, the received signal quality with the base station has to be higher than a threshold.

At step 324, processing unit 281 through SIM card interface selector 284, instructs RF units 271 to use SIM cards 251 through at least one of SIM card interface 261 to connect to the Selected Base Station. Alternatively, processing unit 281 instructs SIM card interface selector 284 to provide information retrieved from one of SIM cards 251 to one of RF units 271 and processing unit 281 also instructs the one of RF units 271 to connect to the Selected Base Station based in part on the information retrieved at the same time if processing unit 281 decides so. For example, the Selected Base Station is base station 114 and any RF unit 271 can be used to connect to base station 114 because any of RF unit 271 can use any of the SIM cards 251.

In one example, base stations 113 and 114 belong to the second wireless communication network and is operated by the second network operator. Base station 114 is the Selected Base Station based in part on the threshold. Processing unit 281 also determines RF unit 271b will be used to establish a wireless connection with Selected Base Station 114. Processing unit 281 then instructs SIM card interface selector 284 to select SIM card interface 261b to connect with a SIM card that has the corresponding authentication information, in this example, SIM card 251b.

In one variant, processing unit 281 will only instruct SIM card interface selector 284 to select SIM card 251b to be served by RF unit 271b to connect to base station 114 if RF unit 271b has established a wireless connection with another base station and the received signal quality is below the threshold. The received signal quality with the another base station is observed at step 302. This ensures that multi-SIM communication device 101b establishes wireless connections with qualified base stations that have observed signal qualities above the threshold.

Figure 4A:
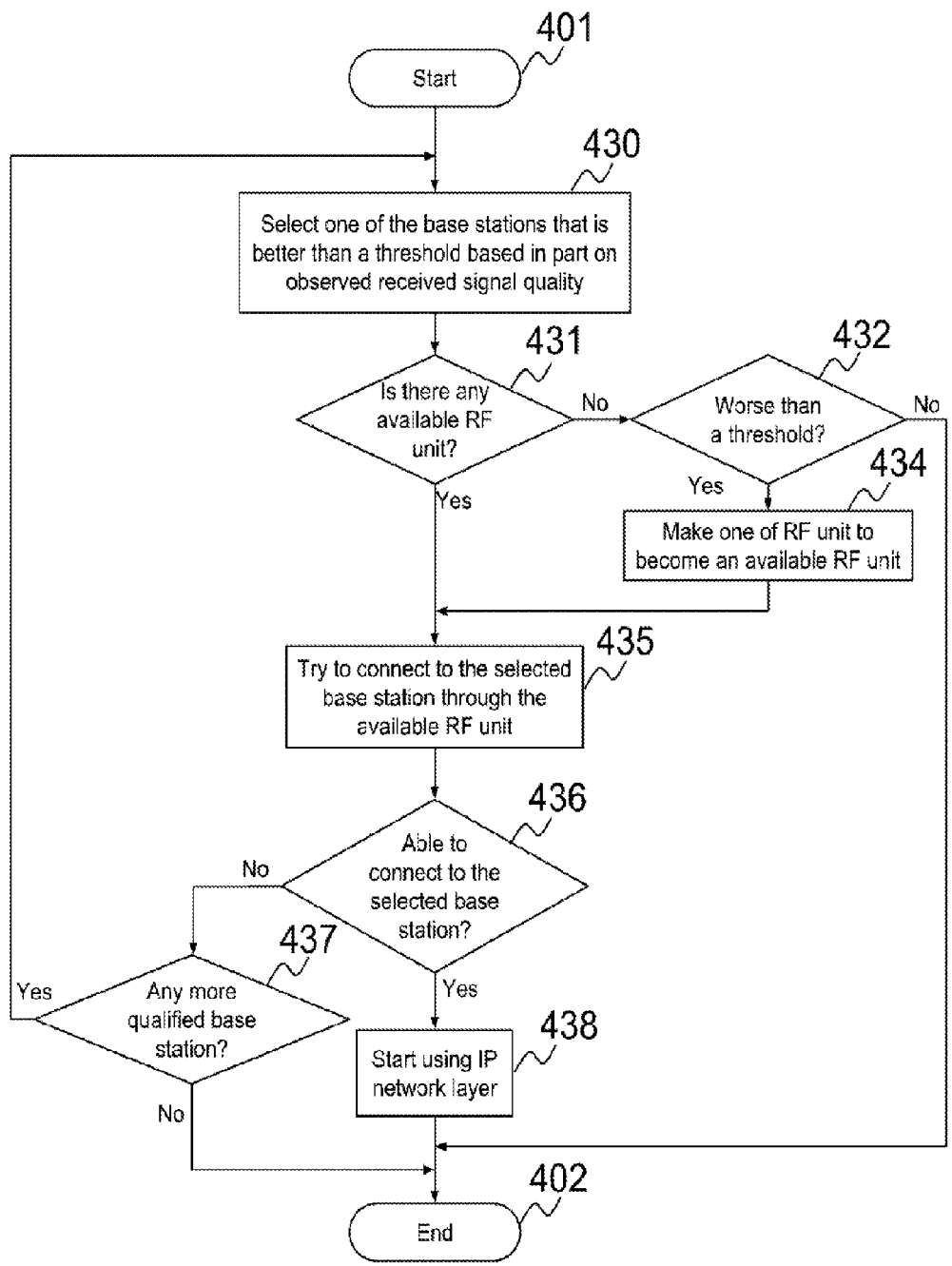
FIG. 4A is a flowchart of a process for selecting a base station with a threshold based in part on observed received signal quality configured according to one of the embodiments of the present invention.

FIG. 4A illustrates one of the embodiments according to the present invention. At step 401, processing unit has already observed received signal quality of the base stations 111, 112, 113 and 114 through a Scanning RF Unit. At step 430, processing unit 231 selects a base station from the list of base stations that are qualified to be the Selected Base Station based in part on observed received signal quality. A base station is qualified if the received signal quality with the base station is higher than a threshold. When there is more than one base station qualified, processing unit 231 selects one of the base stations to be Selected Base Station. The selection may be performed according to received signal quality, predefined priority, preferences, price and etc, in case after step 437, the Selected Base Station cannot be used, processing unit 231 will select another base station from the qualified base stations. For illustration purpose, base station 114 is the Selected Base Station. At step 431, processing unit 231 determines whether a RF unit is available to connect to the Selected Base Station. When there is no RF unit available to connect to the Selected Base Station, processing unit 231 determines whether any of received signal quality with each connected base station, which has established a wireless connection with multi-SIM communication device 101a, is below a threshold at step 432. In an example, for illustration purpose, when RF units 221a and 221b have already established wireless connections with base stations 111 and 113 respectively, there is no RF unit available at step 431. Then processing unit 231 determines whether the received signal quality of the wireless connection established by RF unit 221a and base station 111 or the received signal quality of the wireless connection established by RF unit 221b and base station 113 is below than a threshold at step 432. If none of the received signal quality is below the threshold, the Selected Base Station is not used to establish a wireless connection and the process stops at step 402. If one of the received signal qualities with the base stations is below the threshold, for example, the received signal quality of wireless connection established by RF unit 221b and base station 113 is below the threshold, step 434 is performed.

For illustration purpose, when the received signal quality of wireless connection established by RF unit 221b and base station 113 is lower than the threshold, then at step 434, processing unit 231 instructs RF unit 221b to terminate the wireless connection with base station 113. The termination frees resources at RF unit 221b and allows RF unit 221b to establish a new wireless connection. At step 435, processing unit 231 instructs RF unit 221b to connect to the Selected Base Station. At step 436, processing unit 231 checks whether RF unit 221b is able to establish a wireless connection with the Selected Base Station which is base station 114. If RF unit 221b has successfully established a wireless connection with base station 114, processing unit 231 can then transmitting and receiving IF packets through RF unit 221b and base station 114 at step 438. Those who are skilled in the arts would appreciate that IP packets can be transmitted using transmission control protocol (TCP), user datagram protocol (UDP), or other protocols. If RF unit 221b cannot establish a wireless connection with base station 114, processing unit 231 checks if there is another qualified base station to be the Selected Base Station at step 437. If there is at least one more qualified base station, step 430 is performed to select the at least one more qualified base station. If there is no more qualified base station, the process stops at step 402. In one variant, when there is no more base station qualified to be connected to at step 437, processing unit 231 will attempt to connect to the base station that was disconnected from at step 434. This allows processing unit 231 to try to return to have the same number of wireless connections. In one variant, if a RF unit is capable of establishing a wireless connection without disconnection another wireless connection that has already been established, steps 431, 432 and 434 will then be performed after step 438 in order not to terminate an established wireless connection too early.

Figure 4B:
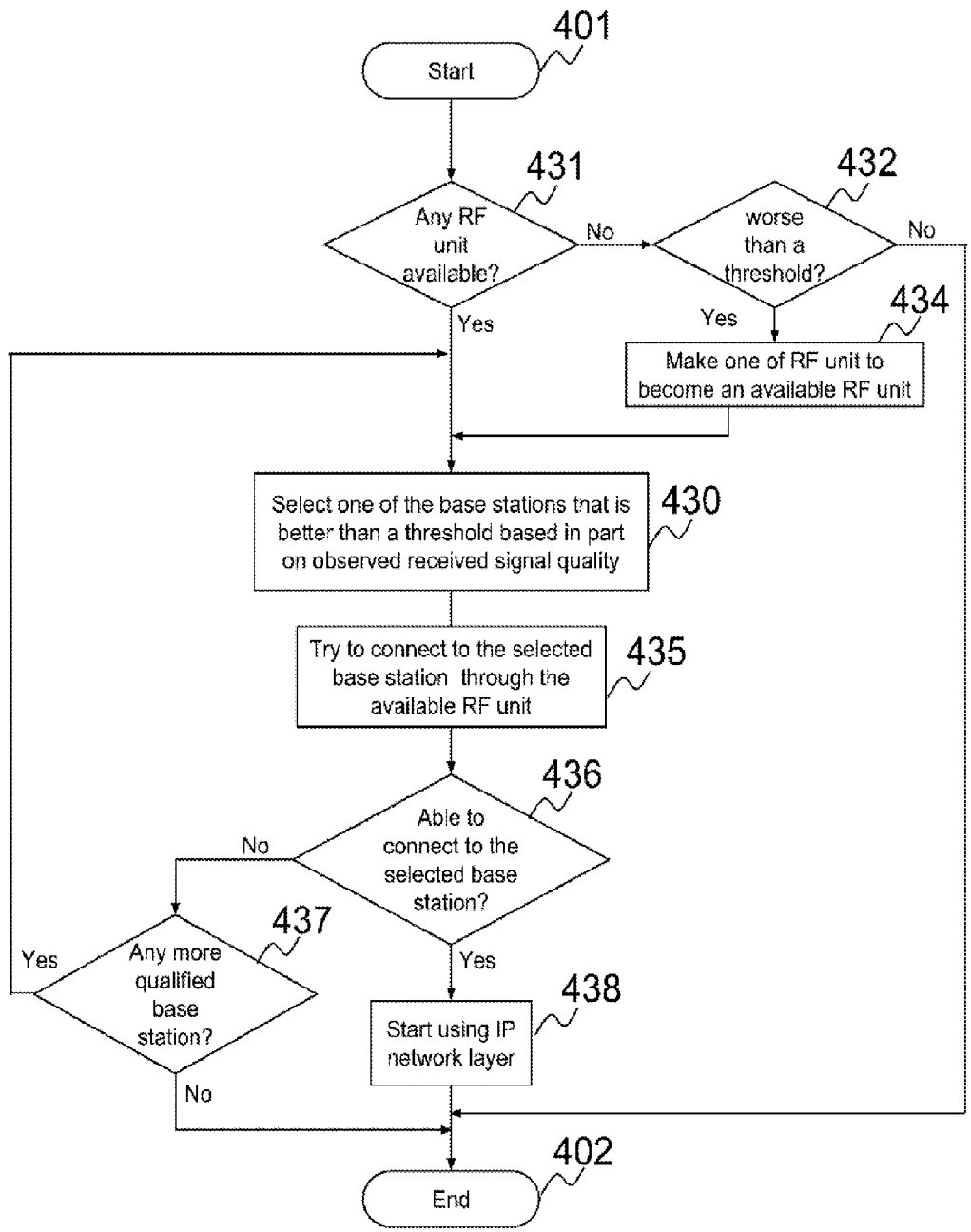
FIG. 4B is a flowchart of a process to select an available RF unit to connect to a base station based in part on observed received signal quality configured according to one of the embodiments of the present invention.

In one variant step 430 is preferred to be performed after step 431 or step 434 as shown in FIG. 4B. As there is no RF unit available and none of the received signal quality for established wireless connection is worse than a threshold, step 434 is avoided in order to reduce the probability of interrupting ongoing data communications and step 430 is also not performed in order to reduce computing resources.

FIG. 4B illustrates one of the embodiments according to the present invention. At step 401, processing unit has already observed received signal quality of the base stations 111, 112, 113 and 114 through a Scanning RF Unit.

At step 431, processing unit 281 determines whether any RF unit is available to connect to the Selected Base Station. When there is no RF unit available to connect to the Selected Base Station, processing unit 281 determines whether any of received signal quality with each connected base station, which has established a wireless connection with multi-SIM communication device 101b, is below a threshold at step 432.

In an example, for illustration purpose, when RF units 271a and 271b have already established wireless connections with base stations 111 and 113 respectively, there is no RF unit available at step 431. Then processing unit 281 determines whether the received signal quality of the wireless connection established by RF unit 271a and base station 111 or the received signal quality of the wireless connection established by RF unit 271b and base station 113 is below a threshold at step 432. If none of the received signal quality is below the threshold, the selected base station is not used to establish a wireless connection and the process stops at step 402. If one of the received signal qualities with the base stations is below the threshold, for example, the received signal quality of wireless connection established by RF unit 271b and base station 113 is below the threshold, step 434 is performed.

At step 434, processing unit 281 instructs RF unit 271b to disconnect from base station 113 so that RF unit 271b can become an available RF unit.

At step 430, processing unit 281 selects a base station from the list of base stations that are qualified to be the Selected Base Station based in part on observed received signal quality. When there are more than one base stations qualified, processing unit 281 selects one of the base stations to be Selected Base Station. The selection may be performed according to received signal quality, predefined priority, preferences, price etc. At step 430, base station 114 is the selected base station after processing unit 281 determines the observed signal quality of base station 114 to be above the threshold. In one variant, at step 436 the Selected Base Station is found not capable of being used and there is no more qualified base station at step 437, step 430 restarts and processing unit 281 will select another base station from the qualified base stations. This is to try to ensure multi-SIM communication device 101b always has at least one established wireless connection with the qualified base station that has the observed received signal quality above the threshold. In one variant, if there is no base station that can offer wireless communication service with observed received signal quality above the threshold, multi-SIM communication device 101b may attempt to establish wireless connections with a base station with the highest observed received signal quality.

At step 435, SIM card 251b is connected to SIM card interface 261b and is authorised to connect with the second wireless communication network and base station 114. Processing unit 281 instructs SIM card interface selector 284 to select SIM card interface 261b, which is connected to SIM card 251b, to establish a wireless connection with the Selected Base Station 114 through RF unit 271b.

At step 436, processing unit 281 instructs SIM card interface selector 284 to select a SIM card interface 261, then verifies whether RF unit 271 is able to establish a wireless connection with a Selected Base Station. If RF unit 271 successfully establishes a wireless connection a base station, processing unit 281 can then transmit and receive IP packets through RF unit 271 and the base station at step 438. If RF unit 271b successfully establishes a wireless connection with base station 114, processing unit 281 then transmits and receives IP packets through RF unit 271b and the base station 114 at step 438. If RF unit 271b cannot establish a wireless connection with base station 114, processing unit 281 checks if there is another qualified base station to be the Selected Base Station at step 437. if there is at least one more qualified base station, step 430 is performed to select the at least one more qualified base station. If there is no more qualified base station, the process stops at step 402. In one variant, when there is no more base station qualified to be connected to at step 437, processing unit 281 may instruct RF unit 271 to connect to the base station, that was disconnected from at step 434. This allows multi-SIM communication device 101b to try to have at least one established wireless connection with the qualified base station that has the observed signal quality above the threshold. In one variant, if a RF unit is capable of establishing a wireless connection without disconnecting another wireless connection that has already been established, steps 431, 432 and 434 will then be performed after step 438 in order not to terminate the established wireless connection too early.

In one variant, step 430 is preferred to be performed after step 431 or step 434. As there is no RF unit available and none of the received signal quality for established wireless connection is worse than a threshold, step 434 is avoided in order to reduce the probability of interrupting ongoing data communications and step 430 is also not performed in order to reduce computing resources.

FIG. 1 also illustrates a network environment that a multi-SIM is capable of transmitting and receiving data packets through an aggregated tunnel according to one of the embodiments of the present invention. Multi-SIM communication device 101, such as multi-SIM communication device 101a, 101b and 101d, that has more than one RF unit, and has established at least two wireless connections between at least two RF units and at least one base station. Multi-SIM communication device 101c cannot be used for this embodiment as it only has one RF unit 293a unless RF unit 293a is able to establish more than one wireless connection. An aggregated tunnel is then established through the at least two wireless connections. Within each of the established wireless connections, a tunnel is established between multi-SIM communication device 101 and network node 119 for transmitting and receiving data packets. The data packets may be encapsulated by using a tunneling protocol packet. The aggregated tunnel may be an aggregated virtual private network (VPN) connection. Multi-SIM communication device 101 and network node 119 may first negotiate tunnel configuration variables, such as address assignments, compression parameters and encryption methods before transmitting and receiving data packets. Multi-SIM communication device 101 transmits the encapsulated data packets across interconnected networks 117. Network node 119 may decapsulate the encapsulated data packets to retrieve the data packets upon receiving the encapsulated data packets.

In one example, multi-SIM communication device 101 establishes a tunnel 151 using RF unit 221 *a* with base station 111 on the first wireless communication network and another tunnel 152 with RF unit 221 *b* with base station 113 on the second wireless communication network. For the purpose of illustration, the tunnel established using RF unit 221 *a* is referred to as tunnel A and the tunnel established using RF unit 221 *b* is referred to as tunnel B. Tunnel A and tunnel B together are used to form an aggregated tunnel 155.

When the established wireless connections between multi-SIM communication device 101 and both base station 111 and 113 are stable, multi-SIM communication device 101 are able to transmit data packets through the aggregated tunnel using both tunnel A and tunnel 8 without many packet drops. When tire established wireless connection between multi-SIM communication device 101 and base station 111 is stable but the established wireless connection between multi-SIM communication device 101*a* and base station 113 is unstable, tunnel B may become broken. Multi-SIM communication device 101 then transmits data packets through the aggregated tunnel using tunnel A and stops transmitting data packets through tunnel B. In one variant, after the wireless connection between multi-SIM communication device 101*a* and base station 113 is stable again and tunnel B is re-established, multi-SIM communication device, then transmits data packets using both tunnel A and tunnel B. In one variant, when the Scanning RF Unit has observed that received signal quality of the wireless connection between multi-SIM communication, device 101*a* and base station 113 is worsening, multi-SIM communication device 101 may not use tunnel B even though tunnel B is not broken in order to reduce packet toss.

Figure 5:
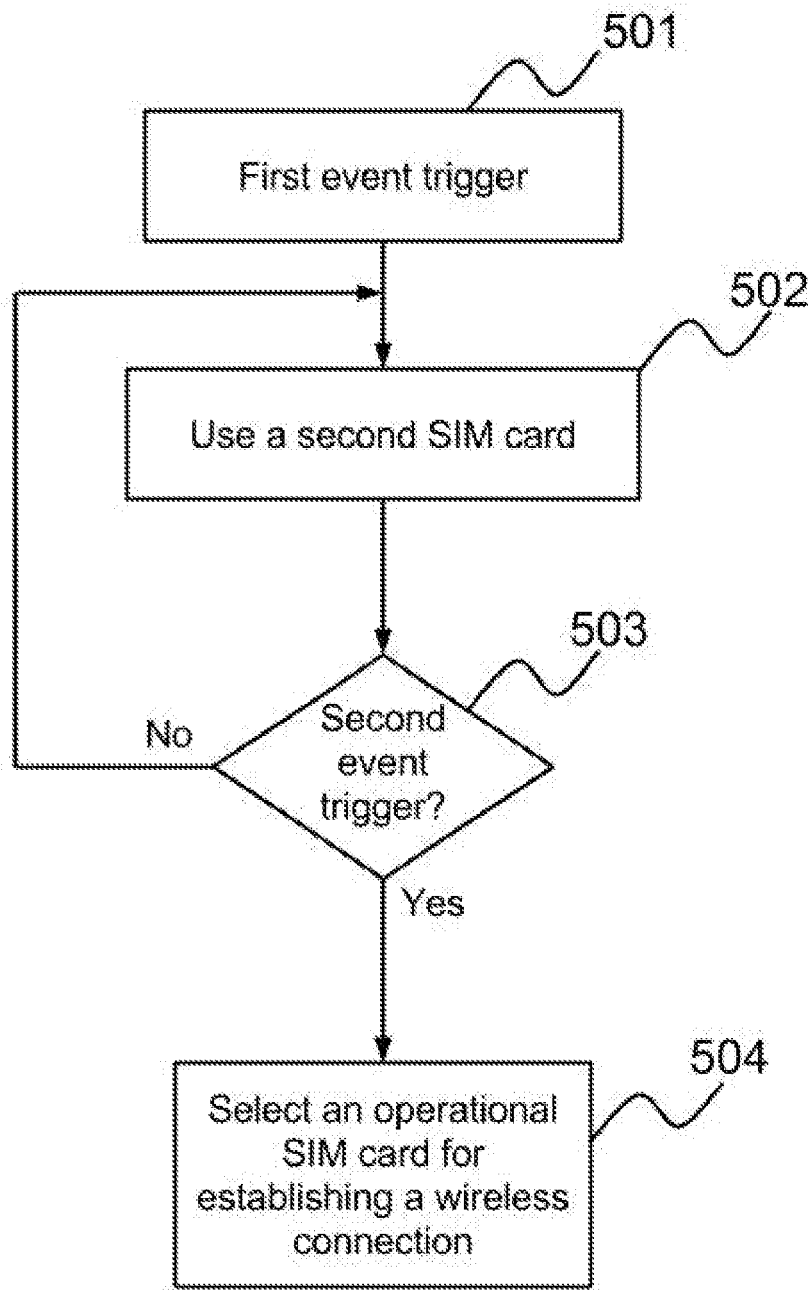
FIG. 5 is a flowchart of a process for event triggers configured according to one of the embodiments of the present invention.

FIG. 5 is a flowchart illustrating the steps according to various embodiments of the present invention. Multi-SIM communication devices 101*a* 101*b* and 101*c* can be viewed in conjunction with FIG. 5 respectively to illustrate how event triggers could be used to select one of more SIM cards. Event triggers include but are not limited to a geographic location trigger, a data usage trigger, a received signal quality trigger, a time trigger, a duration of usage trigger, a billing cycle trigger etc. Event triggers may be referred to as a first event trigger and a second event trigger as illustrated in FIG. 5, step 501 and 503 respectively. In one variant, a plurality of triggers can be combined to form an event trigger. For example, the first event trigger can be based on a geographic location trigger and a data usage trigger. In another example, the second event trigger can be based on the duration of usage trigger and the billing cycle information trigger. In one variant, the first event trigger and the second event trigger can be based on the same trigger(s).

Multi-SIM communication device has two SIM cards 291*a* and 291*b*, two SIM card interfaces 292*a* and 292*b*, one processing unit 295, one storage unit 295 and one RF unit 293*a*. There are also two wireless communication networks available where SIM 291*a* is authorised for a first wireless communication network, and SIM 291*b* is authorised for a second wireless communication network.

Multi-SIM communication device 101*c* originally uses SIM card 291*a*, for illustration purpose only, as the first SIM card to establish a wireless communication. At step 505, when a first event trigger has occurred, SIM card 291*a* cannot be used. The wireless connection established using SIM card 291*a* and RF unit 293*a* may have been broken or terminated.

At step 502, multi-SIM communication device 101*c* uses a second SIM card to establish a wireless connection, which is SIM card 291*b* in this example. After RF unit 293*a* has disconnected from the established wireless connection with the first wireless communication network, it can be used to establish another wireless connection with another wireless communication network as SIM 291*b* is authorised to establish wireless connections with the second wireless communication network, therefore it is selected by processing unit 295 to be served by RF unit 293*a* through SIM card interface 292*b* to establish a wireless connection with the second wireless communication network. As there are two SIM cards, SIM card 291*a* and 291*b*, SIM card 291*b* is the only SIM card that can be the second SIM card in step 502. If multi-SIM communication device 101*c* has more SIM cards, one of SIM card 291*b* and the more SIM cards and can be selected to be the second SIM card in step 502. The selection can be based on one or more criteria. For example, the least used SIM card is selected to be the second SIM card. In another example, the SIM card that has the corresponding lowest tariff price is selected to be the second SIM card. In another example, the SIM card that has the expected network performance is selected to be the second SIM card. In another example, each of the SIM card is assigned with a priority and the selection is based on the priority. The priority can be entered by a user of multi-SIM communication device 101*c*, the manufacturer of multi-SIM communication device 101*c*, the position of the SIM sockets used to house the SIM cards, or retrieved from a remote server. The network performance may be determined by using results reported by a Scanning RF Unit.

At step 503, processing unit monitors for a second event trigger or is notified by a second event trigger. The second event trigger may occur clue to but not limited to the following reasons: a duration of usage, conditions of the current connection, reaching the cap of a data usage plan, and geographical location. When the second event trigger does not occur, processing unit 295 continues monitoring for the second event trigger and multi-SIM communication device 101*c* continues using SIM card 291*b*. On the other hand, when the second event trigger occurs, for example, after a duration of usage has been reached, processing unit 295 will perform step 504.

One example for the second event trigger may be based on duration of usage trigger. The duration of usage may be set by the vendor of multi-SIM communication device 101*c*, a user of multi-SIM communication device 101*c* or retrieved from a remote server. One such purpose may be due to a preference in the use of a specific wireless communication network. The user may specify that the second wireless communication network should only be used for sixty minutes per session. In one variant, if multi-SIM communication device 101*c* disconnects from the second wireless communication network, the sixty minute session ends and is restarted when another wireless connection is established with the second wireless communication network at a later dine. After sixty minutes has been reached, the second event trigger occurs and step 504 is performed. Similarly, the first event trigger can also be based on the duration of usage, for example, when the duration of usage has been reached, the first event trigger occurs.

In another variant, it is known that while received signal quality may be above the threshold, it is possible that data packets cannot be transmitted. There are many reasons for this but one example may be when multi-SIM terminal 101*c* has already established a wireless connection with base station 111, but the connection between network controller and interconnected networks 117 is slow. Processing unit 295 may use the observed signal quality as a trigger, in conjunction with a network performance trigger. The network performance trigger may be based on the bandwidth and packet drop rate with network node 119. For example, if the wireless connection established with SIM 291a has signal quality above the threshold but the network performance is below another threshold, the second event trigger occurs. If the signal quality is above a threshold and the network performance above the another threshold, the second event trigger does not occur.

In another example, the second event trigger may be based on geographic location data. Geographic location data may include geographic coordinate data based on the geographic coordinate system. The geographic location data may be received by the RF unit such as RF unit 293a. It may also be received by an embedded or external GPS receiver which is not illustrated in FIG. 2C. The geographic location data may be predefined as a trigger. This may be set by the vendor of multi-SIM communication device 101c, the user of multi-SIM communication device 101c or the data may be retrieved from a remote server. For example, it is possible to locate multi-SIM communication device 101c on a map in real-time as it receives geographic location data. Similarly, the first event trigger can also be based on geographic location data, for example when the geographic location is known to be without of the coverage area of a wireless communication network, the first event trigger occurs. One scenario where this may be used is when the multi-SIM communication device is without the coverage area of a wireless communication network. In order to continue transmitting data and not incur wireless communication network roaming charges or to incur charges from another wireless communication network with a higher tariff pricing, the second event trigger occurs as soon as its geographic location data matches the predefined geographic location trigger. For example, the predefined threshold is a location fence for geographic location A. The geographic location data received by multi-SIM communication device 101c is determined by processing unit 295 to be above the threshold when it is outside of the geographic location A and therefore the second event trigger occurs so that multi-SIM communication device 101c may select another operational SIM card.

In one example, the second event trigger is based on tariff pricing information. The tariff pricing information typically includes at least the monthly cellular subscription cost, the monthly data usage limit, the premium for exceeding the monthly data usage limit, and the premium for using a roaming network. The tariff pricing information may be inputted by a user or retrieved from a remote server, and then stored in storage unit 296 for later retrieval. For illustration purpose only, when processing unit 295 has determined that the tariff price of the second SIM card, which is SIM card 291b, is not the cheapest, a second event trigger occurs. Those who are skilled in the art would appreciate that there are myriad of reasons why the tariff price of SIM card 291b is not the cheapest. Similarly, the first event trigger can also be based on tariff pricing information, for example when the tariff price of SIM card 291a is no longer the cheapest, the first event trigger occurs.

In one variant, processing unit 295 monitors tariff pricing information from network operators corresponding to SIM cards 291a and 291b as it is possible that network operators may change tariff prices. Those who are skilled in the art would appreciate that there are myriad of reasons why network operators change tariff prices. For example, due to congested network environment, a network operator may increase the tariff price in real-time. When processing unit 295 has discovered that the tariff price of the SIM card 291b is not the cheapest, the second event trigger occurs.

In another variant, the second trigger occurs based on both the tariff pricing information and the data usage for both SIM cards 291a and 291b. For example, network operators may have different tariff prices based on data usage especially after the data usage limit has been reached. When processing unit 295 determines that SIM card 291b is no longer the cheapest based on data usage, the second event trigger occurs.

In another example, the second event trigger may be based on the billing cycle information. A billing cycle is when the period of a cellular subscription for communication service, usually monthly. It is common that once a billing cycle ends, the data usage counter ceases for the month and a new billing cycle begins. Similarly, the first event trigger can also be based on the billing cycle information. For example, when the billing cycle is about to end, the first event trigger occurs.

The billing cycle period may be set by the vendor of multi-SIM communication device 101c, a user of multi-SIM communication device 101c or the trigger data may be retrieved from a remote server. One scenario where this may be used is when data traffic per month is capped and a balanced data usage across two SIM cards may be desirable. For the purpose of illustration, the first wireless communication network and second wireless communication network each allows for one gigabyte of data to be transmitted per month and data exceeding the allowance is charged at a high premium. The billing cycle of the first wireless communication network is from the first day to the last day of every month and the billing cycle of the second wireless communication network is from the fourteenth day of the current month to the fourteenth day of the nest month. The user estimates that SIM 291a would be nearing its data usage allowance by the end of the month and hence sets a higher priority based on usage for the second wireless communication network when it is near the end of the month. Similarly, the user sets a higher priority based on usage for the first wireless communication network near the middle of the month as he estimates that SIM 291b would be nearing its data usage allowance by the middle of the month, when its billing cycle is nearing its end. Therefore, the second event trigger occurs near the end of the month and multi-SIM communication device 101c attempts to use SIM 291b. Similarly, the second event trigger occurs near the middle of the month and multi-SIM communication device 101c attempts to use SIM 291a. In one variant the user sets the billing cycle as above, as well as sets communication network priority based on data usage according to the billing cycle. So while SIM 291b has higher priority based on usage near the end of a month, if the data usage on the second wireless communication network is already nearing one gigabyte which is the limit in this illustration, SIM 291a may be selected for use.

In another example, processing unit 295 may receive the second event trigger from RF unit 293a when the observed signal quality is below a threshold. For the purpose of illustration, RF unit 293a is capable of activating the second event trigger when it has determined that the signal quality has fallen to less than the threshold. One example of the threshold is −100 dB. Similarly, the first event trigger can also be based on the observed signal quality. For example, when the observed signal quality is below a threshold, the first event trigger occurs.

In another example, processing unit 295 receives the second event trigger which is based on geographic location data from the operating system, processing unit 295 then collects signal quality data from RF unit 293*a* and stores both sets of data to storage unit 296. For the purpose of illustration, processing unit 295 combines both sets of data over a period of time, creating a record of different geographic areas and their prevailing signal quality. With this information, multi-SIM communication device 101*c* may be able to anticipate areas where the signal quality is below a threshold and activate the second event trigger in order to use another wireless communication network.

Another example for the second event trigger may be based on a time trigger. The time trigger may be set by the vendor of multi-SIM communication device 101*c*, the user of multi-SIM communication device 101*c*, retrieved from a remote server or retrieved internally from the multi-SIM communication device. The user may set for the second trigger to occur based on time. There are many reasons why this may be used but one example may be when the second network operator sets its tariff prices to be more expensive between certain time of the day. The user may set the time trigger to occur at a specific time for SIM 292*b*, when SIM 292*b* was used by RF unit 293*a* to establish a wireless connection with the second communication network. Similarly, the first event trigger can also be based on the time trigger, for example, when a specified time of the day has been reached, the first event trigger occurs.

Figure 2C:
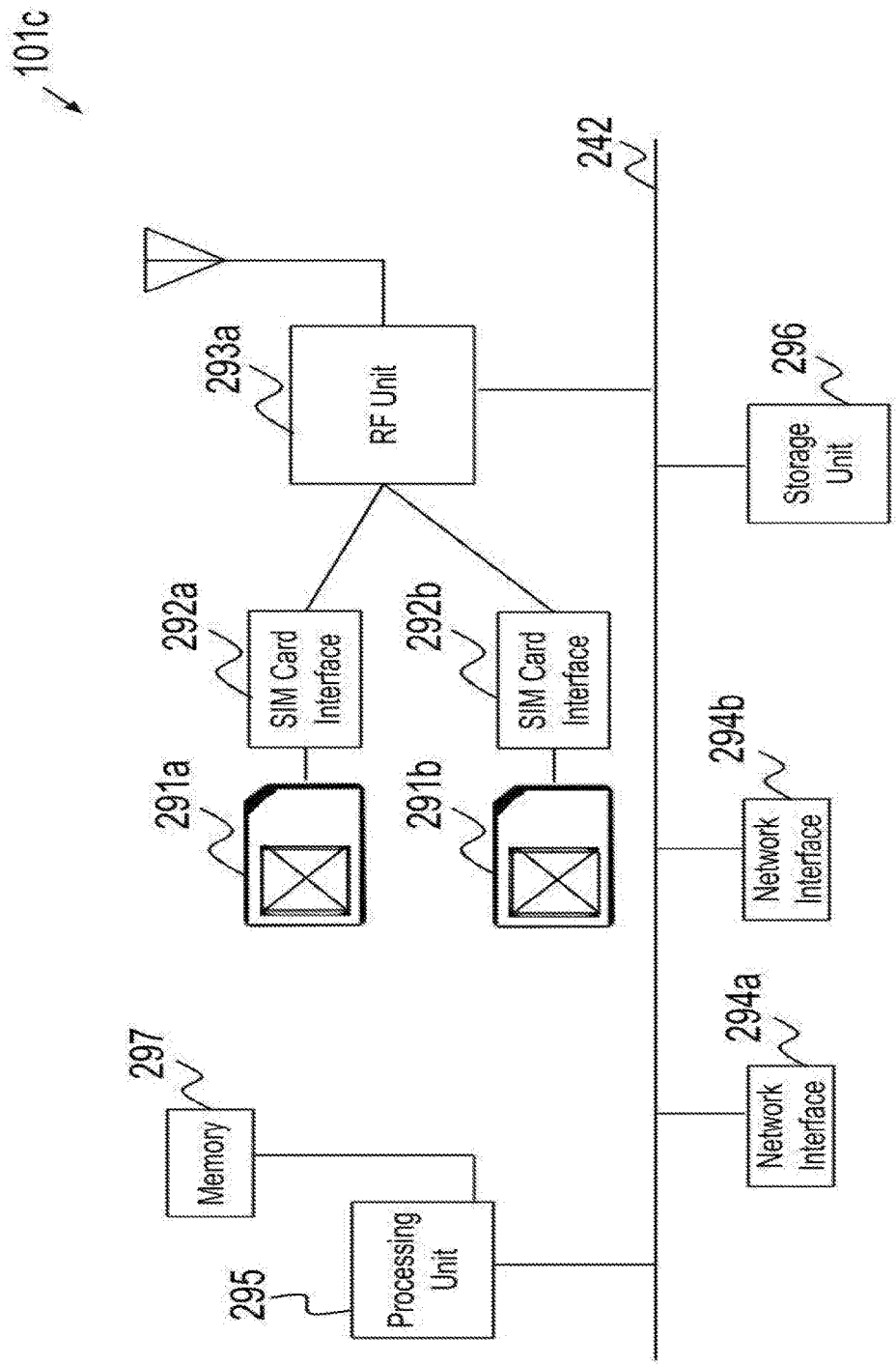
FIG. 2C is a block diagram of multi-SIM communication device with two SIM cards and one RF unit configured according to one of the embodiments of the present invention.
Figure 2D:
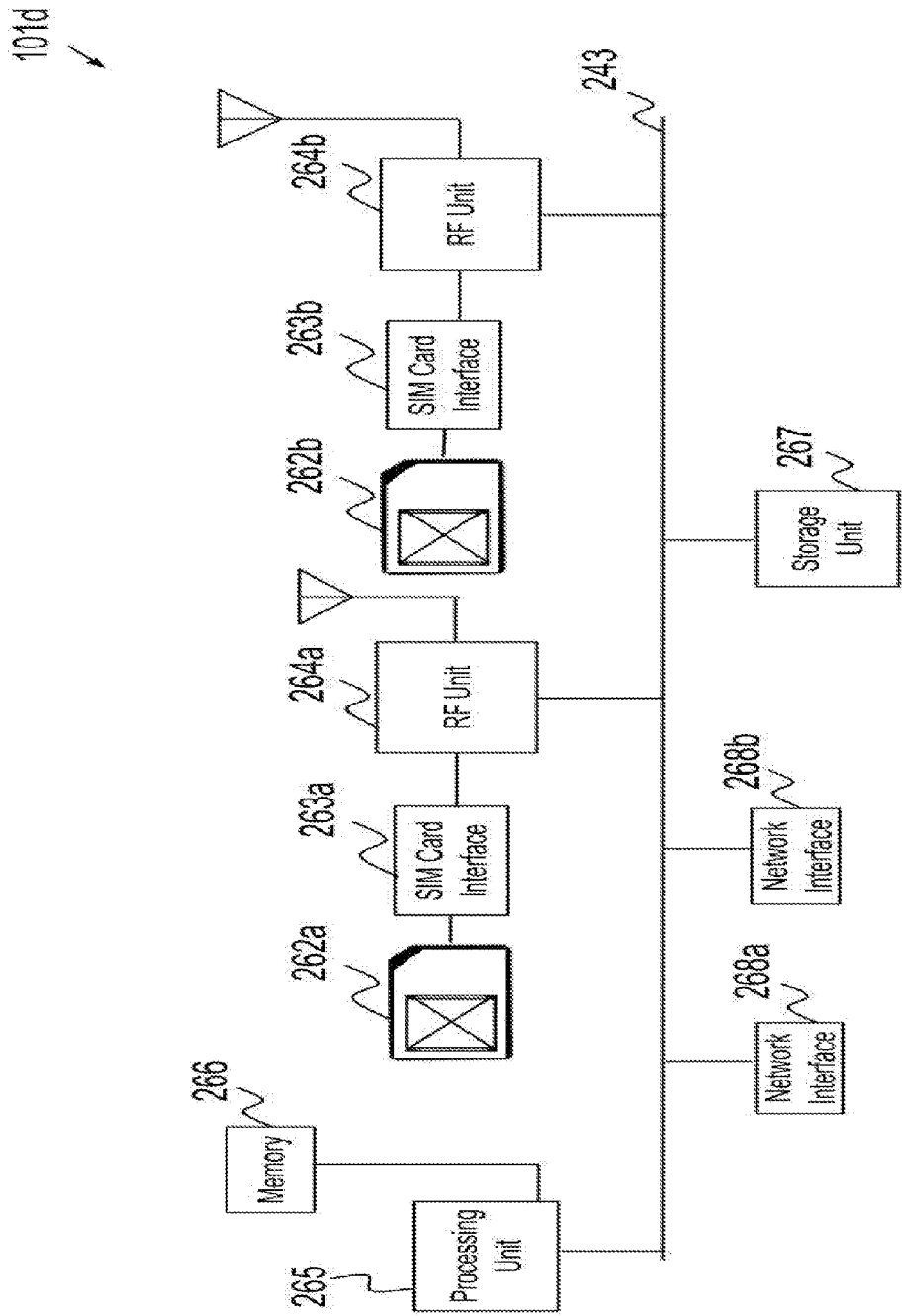
FIG. 2D is a block diagram of multi-SIM communication device with two SIM cars and two RF units configured according to one of the embodiments of the present invention.

In one embodiment of the present invention, a trigger monitor is implemented into multi-SIM terminal 101. The trigger monitor monitors for how frequent the SIM cards are being selected based on a predefined time period. There are many reasons for why the SIM cards are being selected frequently such as when the first and second event triggers are occurring frequently. For example, when a SIM card such as SIM card 295*a* from FIG. 2C is no longer operational, the first event trigger occurs as step 501. A second SIM card such as SIM card 291*b* is used in step 502. When SIM card 291*b* is no longer operational, the second event trigger occurs at step 503. At step 504, an operational SIM card may be SIM 291*a*, SIM 291*b* or another SIM card. When the selected operation SIM card is no longer operational again, the first event trigger may occur again, leading to the second event trigger and so on. The reason why the SIM card may no longer be operational could be due but not limited to failure of the wireless communication networks, failure of the SIM card, being outside of the coverage area of any base station etc. When the SIM card selection frequency reaches a threshold and a specified period of time has lapsed, the processing unit may apply a time delay to one or both event triggers so that the performance of step 504 is delayed. If after another predefined period of time, the frequency of SIM card selection still has the characteristics of for example, a SIM card failure, processing unit may instruct the RF units to perform an action such as power-cycle, enter sleep mode, enter a low power mode etc. The purpose of this implementation is to minimize the chance of the first and the second event trigger from occurring repeatedly.

After the second event trigger has occurred, step 504 is performed by processing unit 295 to select an operational SIM card. The operational SIM card can be the first SIM card, the second SIM card or another SIM card. As there is no SIM card other than SIM cards 291*a* and 291*b* in this example, there is no another SIM card. If there are other SIM cards other than SIM cards 291*a* and 291*b* in multi-SIM communication device 101*c*, the other SIM cards can be the another SIM card. After a SIM card is selected to be the operational SIM card, processing unit 295 can use the operational SIM card to establish a wireless connection. There can be no SIM card selected to be the operational SIM card and result in no wireless connection being able to be established.

Figure 6:
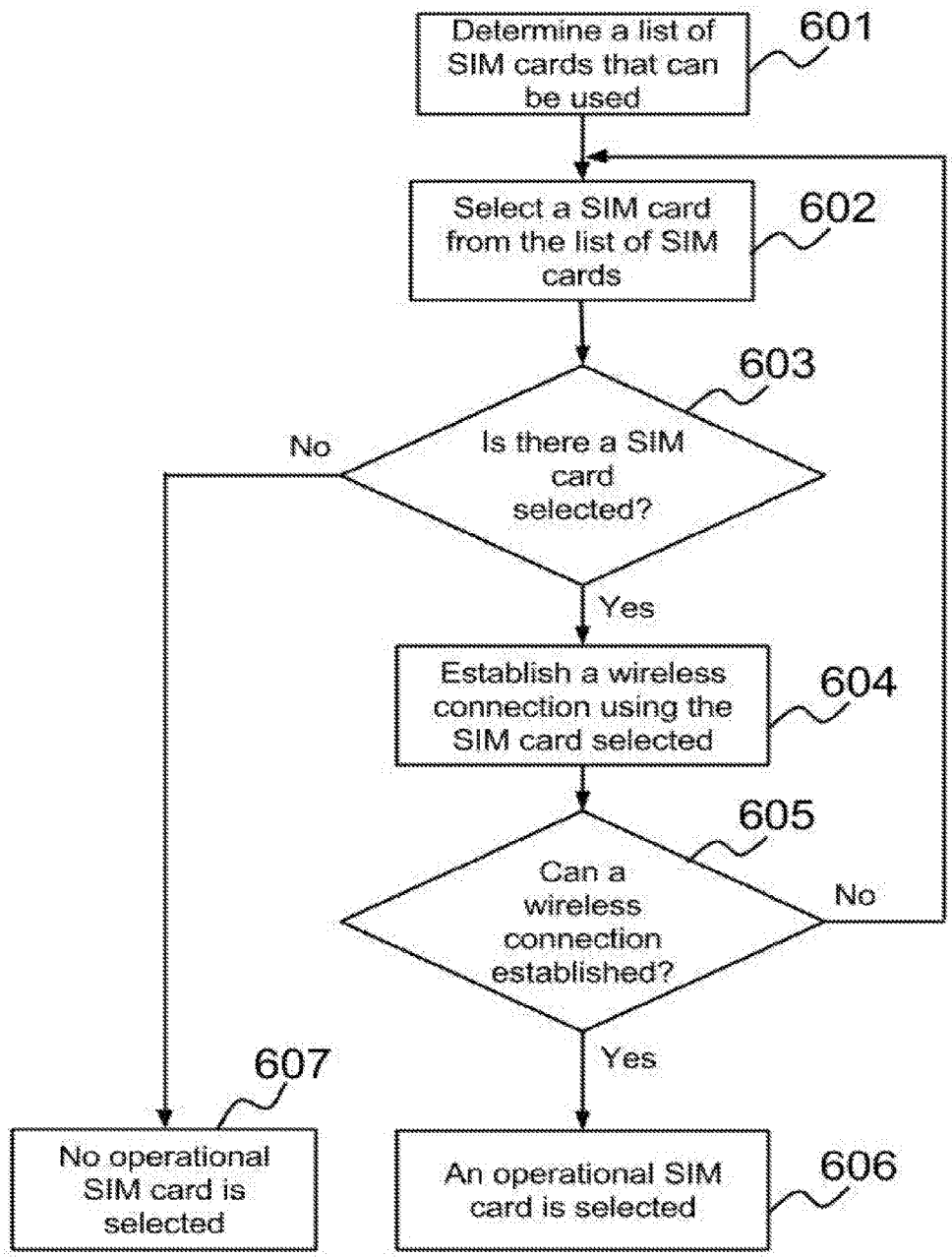
FIG. 6 is a flowchart of a process to select an operational SIM card configured according to one of the embodiments of the present invention.

In one variant, after step 504, processing unit 295 will go back to step 501 when the first event trigger is triggered. This allows the first SIM card be used again in case the first event, trigger is triggered. For example, the operational SIM card is SIM card FIG. 6 illustrates processes according to one of embodiments of the present invention that an operational SIM card can be selected, in step 504. There is no limitation that the processes of FIG. 6 are the only processes to perform step 504.

At step 601, processing unit 295 determines the list of SIM cards that can be used as the operational SIM card. As multi-SIM communication device 101*c* has SIM cards 291*a* and 291*b*, the list of SIM cards is consisted of SIM cards 291*a* and 291*b*. If one of the SIM cards 291*a* and 291*b* is removed, the removed SIM card is not in the list of SIM cards. If a multi-SIM communication device has ten SIM cards, the list of SIM cards is consisted of the ten SIM cards. In one variant, SIM cards that can be included in the list of SIM cards are subject to one or more rules. For example, a rule can be that the second SIM card, which is SIM 291*b* in this embodiment, cannot be in the list of SIM cards as the conditions for triggering the second event trigger may still apply. In another example, SIM card(s) that is(are) being used by other RF unit(s) cannot be in the list of SIM cards as the SIM card(s) has(have) already being used. The rule can be entered by a user of the multi-SIM communication device, the manufacturer of the multi-SIM communication device or retrieved from a remote server.

At step 602, processing unit 295 select a SIM card from the list of SIM cards. Multi-SIM communication device 101*c*, for illustration purpose only, selects SIM card 291*a*. The selection can be based on one or more criteria. For example, the SIM card that has the lowest price tariff is selected. In another example, the SIM card that may have the best network performance is selected. The network performance may be determined by using results reported by a Scanning RF Unit. In one variant, the one or more criteria at step 602 may be the same as the one or more criteria at step 502.

At step 603, if there is no SIM card can be selected, the selection process stops at step 607 that no operational SIM card is selected. When all the SIM cards in the list of SIM cards have been used to establish corresponding wireless connections at step 604 and no wireless connection can be established at 605, there will be no further SIM card in the list of SIM cards can be selected at step 602 and results in no operational SIM card is selected.

At step 604, the selected SIM card is used to establish a wireless connection. For example, selected SIM card at step 603 is SIM card 291*a*, then processing unit 295 tries to use RF unit 293*a* and SIM card 291*a* to establish a wireless connection. If a wireless connection can lie established, this indicates that the SIM card selected, i.e. SIM card 291*a* in this example, can be the operational SIM card at step 606. If no wireless connection can be established, then step 602 will be performed to select another SIM card from the list of SIM cards. There are myriads reasons why a wireless connection cannot be established. For example, multi-SIM communication device 101*c* is out of the coverage area of the network of the network operator corresponding to SIM card 291a or the quota of SIM card 291a is used up.

In one embodiment, multi-SIM communication device 101a may apply the processes in FIG. 5 and FIG. 6 to RF unit 221b and SIM cards 201b and 201c that RF unit 221b are capable of connecting to through SIM card interfaces 221b and 211c respectively. However, multi-SIM communication device 101a does not apply the processes in FIG. 5 and FIG. 6 to RF unit 221a and SIM cards 201a as RF unit 221a is only accessible to SIM card 201a. For illustration purpose only, in this embodiment, SIM card 201b is the first SIM card and SIM card 201c is the second SIM card. In one variant, RF unit 221a can be used as a Scanning RF Unit to provide received signal qualify information for processing unit 231 to select operational SIM card at step 502 and/or step 504 when received signal qualify is a criteria for step 502 and/or step 504. In one variant, RF unit 221a is not used as a Scanning RF Unit and instead is used to establish a wireless connection. This allows two wireless connections established at multi-SIM communication device 101a.

In one embodiment, multi-SIM communication device 101a may apply the processes in FIG. 5 and FIG. 6 to SIM cards 201a, 201b and 201c. For illustration purpose only, in this embodiment, SIM card 201a is the first SIM card and SIM card 201b is the second SIM card. When SIM card 201a is used, RF unit 221a is used to establish a wireless connection while RF unit 221b is not used to establish a wireless connection or is used as a Scanning RF Unit. When SIM card 201b used at step 502, RF unit 2221b is used to establish a wireless connection while RF unit 221a is not used to establish a wireless connection or is used as a Scanning RF Unit. Therefore, only one of SIM cards 201a, 201b and 201c is used to establish a wireless connection and other two SIM cards can be used as backups.

In one embodiment, multi-SIM communication device 101a may apply the processes in FIG. 5 and FIG. 6 to SIM cards 201a, 201b and 201c. For illustration purpose only, in this embodiment, SIM card 201b is the first SIM card, SIM card 201a is the second SIM card and operational SIM card can be selected from SIM card 201b or SIM card 201c. This allows SIM card 201a to be used quickly when SIM card 201b is not used due to the first event trigger. This also allows processing unit 295 to have adequate time to determine whether to use SIM cards 201b or 201c as the operational SIM card as only one of SIM cards 201b and 201c can be used by RF unit 221b at any moment to establish a wireless connection.

In one variant, RF unit 221a can be used as a Scanning RF Unit to provide received signal qualify information for processing unit 231 to select operational SIM card at step 502 and/or step 504 when received signal qualify is a criteria for step 502 and/or step 504.

In one embodiment, multi-SIM communication device 101b may apply the processes in FIG. 5 and FIG. 6 to RF units 271a and 271b and SIM cards 251a, 251b and 251c that RF units 271a and 271b are capable of connecting to through SIM card interface selector 284, and then SIM card interfaces 261a, 261b and 261c respectively. When processing unit 281 selects SIM cards for use as the first SIM card, the second SIM card and the operational SIM card, processing unit 281 can instruct SIM card interface selector 284 to select one of SIM cards 251a, 251b and 251c for RF units 271a or 271b. In one example, SIM cards 251a is the first SIM card and the operational SIM card; SIM card 251b is the second SIM card and SIM card 251c is used for a Scanning RF unit to allow frequent observation of received signal quality.

In one variant, multi-SIM communication device 101b is configured in such a way where RF unit 271a is able to use SIM cards 251a and 251b as the first SIM card, the second SIM card and the operational SIM card. RF unit 271b is able to use SIM card 261c only. When processing unit 281 selects SIM cards 251a and 251b to the first SIM card, the second SIM card and the operational SIM card, processing unit 281 can instruct SIM card interface selector 284 to perform the selection. Therefore, multi-SIM communication device 101b is capable of establishing two wireless connections. A plurality of tunnels can be established in the two wireless connections. Data packets can be transmitted and received through the plurality of tunnels. Further, the plurality of tunnels can be aggregated to form one aggregated VPN connection.

The invention claimed is:

1. An apparatus comprising:
a first plurality of radio frequency (RF) units;
a first plurality of Subscriber Identification Module (SIM) card interfaces;
at least one processing unit;
at least one non-transitory computer readable storage medium;
at least one SIM card interface selector;
wherein the at least one SIM card interface selector is connected to a first group of SIM card interfaces and a first group of RF units;
wherein the at least one non-transitory computer readable storage medium has computer-executable instructions embodied thereon;
wherein when executed by the at least one processing unit, the computer-executable instructions cause the at least one processing unit to:
a) select a second plurality of SIM card interfaces and a second plurality of RF units; wherein the first group of SIM card interfaces includes the second plurality of SIM card interfaces; wherein the first group of RF units includes the second plurality of RF units;
b) control the at least one SIM card interface selector to connect each of the second plurality of SIM card interfaces to a corresponding RF unit of the second plurality of RF units;
c) control a first RF unit to scan base stations capable of establishing wireless connection; wherein the first RF unit is one of the first plurality of RF units;
d) control a second RF unit to observe received signal quality of the base stations; wherein the second RF unit is one of the first plurality of RF units;
e) adjust data transmission performance metric monitoring frequency based on observed received signal quality;
f) select a second group of SIM card interfaces and a second group of RF units; wherein the first group of SIM card interfaces includes the second group of SIM card interfaces; wherein the first group of RF units includes the second group of RF units;
g) control the at least one SIM card interface selector to connect each of the second group of SIM card interfaces to corresponding RF units of the second group of RF units;
h) establish wireless connections through the first group of RF units;
i) establish a plurality of tunnels through the wireless connections;
j) aggregate the plurality of tunnels to form one aggregated tunnel;

k) negotiate tunnel configuration variables with a receiver node before transmitting and receiving data packets; wherein the tunnel configuration variables comprise address assignments, compression parameters and encryption method;

wherein the first RF unit and the second RF unit are the same or different RF unit(s);

wherein a quantity of SIM card interfaces in the first group of SIM card interfaces is the same as or more than a quantity of RF units in the first group of RF units;

wherein the first plurality of SIM card interfaces include the first group of SIM card interfaces;

wherein the first plurality of RF units include the first group of RF units;

wherein the at least one SIM card interface selector and the at least one processing unit are different hardware;

wherein the at least one SIM card interface selector is controlled by the at least one processing unit; and wherein step (a) is performed substantially based on at least one of the following selection criteria: time, duration of usage, and billing cycle information.

2. The apparatus of claim 1, wherein when executed by the at least one processing unit, the computer-executable instructions cause the at least one processing unit to monitor data transmission performance metric more frequently when received signal quality is below a threshold.

3. The apparatus of claim 1, wherein step (f) is performed substantially based on at least one of the following selection criteria: time, duration of usage, and billing cycle information.

4. The apparatus of claim 1, wherein when executed by the at least one processing unit, the computer-executable instructions cause the at least one processing unit to:
l) select a base station based on in part observed received signal quality;
m) select a third RF unit to connect to the selected base station; wherein the third RF unit is one of the second plurality of RF units; and
n) transmit data packets based on in part observed received signal quality;
wherein steps (l), (m) and (n) are performed before step (e).

5. The apparatus of claim 4, wherein the third RF unit has not established any wireless connection before step (m).

6. The apparatus of claim 4, wherein the third RF unit has established wireless connection with a base station having received signal quality below a threshold before step (m).

7. A method for using a plurality of subscriber identity module (SIM) cards at a wireless communication system, wherein the wireless communication system comprises a first plurality of SIM card interfaces, a first plurality of radio frequency (RF) units, at least one non-transitory computer readable storage medium, and at least one SIM card interface selector;

wherein the at least one non-transitory computer readable storage medium has computer-executable instructions embodied thereon, and wherein the at least one SIM card interface selector is connected to a first group of SIM card interfaces and a first group of RF units, the method comprising:

a) selecting a second plurality of SIM card interfaces and a second plurality of RF units; wherein the first group of SIM card interfaces includes the second plurality of SIM card interfaces; wherein the first group of RF units includes the second plurality of RF units; and b) controlling the at least one SIM card interface selector to connect each of the second plurality of SIM card interfaces to a corresponding RF unit of the second plurality of RF units;

c) controlling a first RF unit to scan for base stations capable of establishing wireless connection; wherein the first RF unit is one of the first plurality of RF units;

d) controlling a second RF unit to observe received signal quality of the base stations; wherein the second RF unit is one of the first plurality of RF units;

e) adjusting data transmission performance metric monitoring frequency based on observed received signal quality;

f) selecting a second group of SIM card interfaces and a second group of RF units; wherein the first group of SIM card interfaces includes the second group of SIM card interfaces; wherein the first group of RF units includes the second group of RF units;

g) controlling the at least one SIM card interface selector to connect each of the second group of SIM card interfaces to corresponding RF units of the second group of RF units;

h) establishing a wireless connection for each of the first group of RF units, i) establishing a plurality of tunnels through the wireless connections;

j) aggregating the plurality of tunnels to form one aggregated tunnel;

k) negotiating tunnel configuration variables with a receiver node before transmitting and receiving data packets; wherein the tunnel configuration variables comprise address assignments, compression parameters and encryption method;

wherein the first RF unit and the second RF unit are the same or different RF unit(s);

wherein a quantity of SIM card interfaces in the first group of SIM card interfaces is the same as or more than a quantity of RF units in the first group of RF units;

wherein the first plurality of SIM card interfaces include the first group of SIM card interfaces;

wherein the first plurality of RF units include the first group of RF units;

wherein the at least one SIM card interface selector and the at least one processing unit are different hardware;

wherein the at least one SIM card interface selector is controlled by the at least one processing unit; and wherein step (a) is performed substantially based on at least one of the following selection criteria: time, duration of usage, and billing cycle information.

8. The method of claim 7, wherein when executed by the at least one processing unit, the computer-executable instructions cause the at least one processing unit to:
l) select a base station based on in part observed received signal quality;
m) select a third RF unit to connect to the selected base station; wherein the third RF unit is one of the second plurality of RF units;
n) transmit data packets based on in part observed received signal quality;
wherein steps (f), (g), and (h) (l), (m) and (n) are performed before step (e).

9. The method of claim 8, wherein the third RF unit has not established any wireless connection before step (m).

10. The method of claim 8, wherein the third RF unit has established wireless connection with a base station having received signal quality below a threshold before step (m).

11. The method of claim 7, wherein step (f) is performed substantially based on at least one of the following selection criteria: time, duration of usage, and billing cycle information.

12. A wireless communication system comprising:
a plurality of radio frequency (RF) units;
a plurality of Subscriber Identification Module (SIM) card interfaces;
at least one processing unit;
at least one non-transitory computer readable storage medium;
at least one SIM card interface selector;
wherein the at least one SIM card interface selector is connected to a first group of SIM card interfaces and a first group of RF units,
wherein the at least one non-transitory computer readable storage medium, has computer-executable instructions embodied thereon;
wherein when executed by the at least one processing unit, the computer-executable instructions cause the at least one processing unit to:
a) select a first plurality of SIM card interfaces and a first plurality of RF units; wherein the first group of SIM card interfaces includes the first plurality of SIM card interfaces; wherein the first group of RF units includes the first plurality of RF units;
b) control the at least one SIM card interface selector to connect each of the first plurality of SIM card interfaces to a corresponding RF unit of the first plurality of RF units;
c) control a first RF unit to scan for base stations capable of establishing wireless connection; wherein the first RF unit is one of the plurality of RF units;
d) control a second RF unit to observe received signal quality of the base stations; wherein the second RF unit is one of the plurality of RF units;
e) adjust data transmission performance metric monitoring frequency based on observed received signal quality;
f) select a second group of SIM card interfaces and a second group of RF units; wherein the first group of SIM card interfaces includes the second group of SIM card interfaces; wherein the first group of RF units includes the second group of RF units;
g) control the at least one SIM card interface selector to connect each of the second group of SIM card interfaces to corresponding RF units of the second group of RF units;
h) establish wireless connections through the first group of RF units;
i) establish a plurality of tunnels through the wireless connections;
j) aggregate the plurality of tunnels to form one aggregated tunnel;
k) negotiate tunnel configuration variables with a receiver node before transmitting and receiving data packets; wherein the tunnel configuration variables comprise address assignments, compression parameters and encryption method;
wherein the first RF unit and the second RF unit are the same or different RF unit(s);
wherein a quantity of the plurality of SIM card interfaces is the same as or more than a quantity of the plurality of RF units;
wherein the at least one SIM card interface selector and the at least one processing unit are different hardware;
wherein the at least one SIM card interface selector is controlled by the at least one processing unit; and
wherein step (a) is performed substantially based on at least one of the following selection criteria: time, duration of usage, and billing cycle information.

13. The wireless communication system of claim 12, wherein the at least one SIM card interface selector allows the plurality of RF units to connect to any of the plurality of SIM card interfaces according to instructions from the at least one processing unit.

14. The wireless communication system of claim 13, further comprising at least one local area network (LAN) interface.

15. The wireless communication system of claim 13, wherein the plurality of RF units are housed in the wireless communication system.

16. The wireless communication system of claim 13, wherein the instructions include an instruction for controlling the at least one SIM card interface selector and is originated from a remote server.

* * * * *